(12) United States Patent
Chen et al.

(10) Patent No.: US 9,667,990 B2
(45) Date of Patent: May 30, 2017

(54) PARALLEL DERIVED DISPARITY VECTOR FOR 3D VIDEO CODING WITH NEIGHBOR-BASED DISPARITY VECTOR DERIVATION

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 14/290,374

(22) Filed: May 29, 2014

(65) Prior Publication Data
US 2014/0355685 A1    Dec. 4, 2014

Related U.S. Application Data

(60) Provisional application No. 61/829,821, filed on May 31, 2013.

(51) Int. Cl.
*H04N 7/12* (2006.01)
*H04N 19/52* (2014.01)
*H04N 19/597* (2014.01)

(52) U.S. Cl.
CPC ........... *H04N 19/52* (2014.11); *H04N 19/597* (2014.11)

(58) Field of Classification Search
CPC ....................................................... H05N 19/52
USPC .................................................... 375/240.16
See application file for complete search history.

(56) References Cited

U.S. PATENT DOCUMENTS

| 8,923,399 B2 | 12/2014 | Yang |
| 2005/0021814 A1 | 1/2005 | Wang et al. |
| 2008/0170618 A1 | 7/2008 | Choi et al. |
| 2010/0135391 A1 | 6/2010 | Tian et al. |
| 2010/0150248 A1 | 6/2010 | Pandit et al. |
| 2010/0158129 A1 | 6/2010 | Lai et al. |
| 2010/0177824 A1 | 7/2010 | Koo et al. |
| 2010/0189182 A1 | 7/2010 | Hannuksela |
| 2012/0185570 A1 | 7/2012 | Bouazizi et al. |

(Continued)

FOREIGN PATENT DOCUMENTS

WO    2012171442 A1    12/2012

OTHER PUBLICATIONS

Sjoberg, et al., "Overview of HEVC high-level syntax and reference picture management," IEEE Trans. Circuits Syst. Video Technology, vol. 22, No. 12, Dec. 2012, pp. 1858-1870.

(Continued)

*Primary Examiner* — Richard Torrente
(74) *Attorney, Agent, or Firm* — Shumaker & Sieffert, P.A.

(57) ABSTRACT

For each respective coding unit (CU) of a slice of a picture of the video data, a video coder may set, in response to determining that the respective CU is the first CU of a coding tree block (CTB) row of the picture or the respective CU is the first CU of the slice, a derived disparity vector (DDV) to an initial value. Furthermore, the video coder may perform a neighbor-based disparity vector derivation (NBDV) process that attempts to determine a disparity vector for the respective CU. When performing the NBDV process does not identify an available disparity vector for the respective CU, the video coder may determine that the disparity vector for the respective CU is equal to the DDV.

23 Claims, 12 Drawing Sheets

(56) References Cited

U.S. PATENT DOCUMENTS

| | | | |
|---|---|---|---|
| 2013/0229485 A1* | 9/2013 | Rusanovskyy | H04N 13/0048 348/43 |
| 2014/0078254 A1 | 3/2014 | Lin et al. | |
| 2014/0098189 A1 | 4/2014 | Deng et al. | |
| 2014/0240456 A1 | 8/2014 | Kang et al. | |
| 2014/0241430 A1 | 8/2014 | Zhang et al. | |
| 2014/0254682 A1 | 9/2014 | Chen et al. | |
| 2015/0201215 A1 | 7/2015 | Chen et al. | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_13 d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 643 pp.

Zhang, et al., "CE5.h: Disparity vector generation results", JCT2-A0097, JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.

Su, et al., "3DV-CE1.a: Block-based View Synthesis Prediction for 3DV-ATM", JCT2-A0107, MPEG Meeting; Jul. 16-20, 2012; Stockholm; (Motion Picture Expert Group or ISO/IEC JTC/1SC29/WG11),, No. m26069, XP030054484, 5 pp.

Sung, et al., "3D-CE5.h: Simplification of disparity vector derivation for HEVC-based 3D video coding," MPEG Meeting; Jul. 16-20, 2012, Document JCT2-A0126, 4 pp.

Kang, et al., "3D-CE5.h related: Improvements for disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B0047, XP030130228, 4 pp.

Tech, et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 118 pp.

Hannuksela, et al., "3D-AVC Draft Text 5," JCT3V-C1002, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 82 pp.

Zhang L., et al., "CE2.h related: Derived disparity vector for 3D-HEVC", JCT-3V Meeting, Apr. 20-26, 2013; Incheon, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-D0194, XP030130858, 4 pp.

Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2,, No. JCT3V-B0090, XP030130271, 5 pp.

Guillemot, et al., "3D-CE5.h: Additional merge candidates derived from shifted disparity candidate predictors", JCT-3V Meeting, MPEG Meeting, Jan. 17-23, 2013; Geneva, (The Joint Collaborative Team on 3D Video Coding Extension Development of ISO/IEC JTC1/SC29/WG11 and ITU-T SG.16 ), URL: http://phenix.int-evry.fr/jct2, No. JCT3V-C148, XP030130564, 6 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v12, 11th Meeting: Shanghai, CN, Oct. 10-19, 2012, updated Dec. 16, 2012, 191 pp.

Zhang, et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, 2nd Meeting: Shanghai, CN, Oct. 13-19, 2012, 4 pp.

Zhang, et al., "3D-CE5.h related—Disparity vector derivation for multiview video and 3DV", MPEG Meeting, Apr.-May 2012, Geneva, (Motion Picture Expert Group or ISO/IEC JTC1/SC29/WG11),, No. m24937, XP030053280, 6 pp.

Sullivan, et al., "Meeting Report of 4th JCT-3V Meeting", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-D1000, XP030130979, 72 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 2012, XP011487803, ISSN: 1051-8215, pp. 1649-1668.

Schwarz, et al., "Description of 3D Video Coding Technology Proposal by Fraunhofer HHI (HEVC compatible; configuration A)", MPEG Meeting; Nov. 28-Dec. 2, 2011; Geneva; (Motion Picture Expert Group or ISO/IEC JTC1/SC29/WG11), No. m22570, XP030051133, 46 pp.

Schwarz, et al., "Description of 3D Video Technology Proposal by Fraunhofer HHI (HEVC compatible, configuration B)", 98. MPEG Meeting; Nov. 28-Dec. 2, 2011; Geneva; (Motion Picture Expert Group or ISO/IEC JTC1/SC29/WG11), No. m22571, XP030051134; 46 pp/.

Schwarz, et al., "Test Model under Consideration for HEVC based 3D video coding," ISO/IEC JTC1/SC29/WG11 MPEG2011/N12559, Feb. 2012, San Jose, CA, USA, 44 pp.

Vetro, et al. "Joint Draft 8.0 on Multiview Video Coding", 28th JVT meeting, Hannover, Germany, Document: JVT-AB204 (rev.1), Jul. 20-25, 2008. available from http:// wftp3. itu.int/av-arch/jvt-site/2008_07_Hannover/JVT-AB204, 73 pp.

(56) References Cited

OTHER PUBLICATIONS

International Search Report and Written Opinion from International Application No. PCT/US2014/040312, dated Sep. 16, 2014, 12 pp.
Response to Written Opinion dated Sep. 16, 2014, from International Application No. PCT/US2014/040312, filed on Feb. 20, 2015, 5 pp.
Second Written Opinion from International Application No. PCT/US2014/040312, dated Apr. 1, 2015, 8 pp.
Response to Second Written Opinion dated Apr. 1, 2015, from International Application No. PCT/US2014/040312, filed on May 28, 2015, 16 pp.
International Preliminary Report on Patentability from International Application No. PCT/US2014/040312, 10 pp.
Zhao, et al., "CE7: MB-Level NBDV for 3D-AVC," Vienna, AT; Jul. 27-Aug. 2, 2013; (The Joint Collaborative Team on 3D Video Coding Extension Development of ISO/IEC JTC1/SC29/WG11 and ITU-T SG.16); Document JCT3V-E0136, Jul. 19, 2013, 10 pp.
Rusanovskyy, et al., "Common Test Conditions of 3DV Core Experiments," Joint Collaborative Team on 3D Video Coding Extensions of ITU-T SG 13 WP 3 and ISO/IEC JTC 1/SC 29/WG11, Jan. 17-23, 2013, Document: JCT3V-C1100, Jan. 22, 2013, 5 pp.
Lin, et al., "3D-CE3.h related: Unconstrained inside-view motion prediction in 3D video coding," Joint Collaborative Team on 3D Video Coding Extensions of ITU-T SG 13 WP 3 and ISO/IEC JTC 1/SC 29/WG11, Jan. 17-23, 2013; Document: JCT3V-C0136, Jan. 17, 2013, 3 pp.
"Applications and Requirements on 3D Video Coding," ISO/IEC JTC1/SC29/WG11, MPEG2011/N12035, Geneva, Switzerland, Mar. 2011, XP030018528, 7 pp.
Tech, et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pages.
Tech, et al., "MV-HEVC Working Draft 2," Document: JCT3V-B1004_d0, Joint Collaborative Team on 3D Video Coding Extension Development, of ITU-T SG 16 WP 3 and ISO/IEC JTC 1/SC 29/WG 11, 2nd Meeting: Shanghai, CN , Oct. 13-19, 2012, 22 pages.
Tech, G., et al., "MV-HEVC Working Draft 1," Joint Collaborative Team on 3D Video Coding Extension Development of ITU-T SG 16 WP 3 and ISO/IEC JTC 1/SC 29/WG 11 1st Meeting: Stockholm, SE, Jul. 16-20, 2012, Document JCT3V-A1004_d0, 20 pages.
Sjoberg R., et al., "Overview of HEVC High-Level Syntax and Reference Picture Management," IEEE Transactions on Circuits and Systems for Video Technology, vol. 22 (12), XP011487804, Dec. 2012, pp. 1858-1870.

* cited by examiner

Currently coded MB

PARALLEL DERIVED DISPARITY VECTOR FOR 3D VIDEO CODING WITH NEIGHBOR-BASED DISPARITY VECTOR DERIVATION

This application claims the benefit of U.S. Provisional Patent Application 61/829,821, filed May 31, 2013, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards that have been developed, or are under development, make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure is related to multiview video coding based on advanced codecs, including the coding of two or more views with the 3D-AVC or 3D-HEVC codecs. Specifically, this disclosure describes techniques related to disparity vectors.

In some examples (e.g., examples for 3D-HEVC coding), for each respective coding unit (CU) of a slice of a picture of the video data, a video coder may set a derived disparity vector (DDV) to a value, in response to determining that the respective CU is the first CU of a coding tree block (CTB) row of the picture or the respective CU is the first CU of the slice. Furthermore, the video coder may perform a neighbor-based disparity vector derivation (NBDV) process that attempts to determine a disparity vector for the respective CU. When performing the NBDV process does not identify an available disparity vector for the respective CU, the video coder may determine that the disparity vector for the respective CU is equal to the DDV. If the video coder is a video encoder, the video coder may generate, based in part on the disparity vector for the respective CU, an encoded representation of a coding block for the respective CU. If the video coder is a video decoder, the video coder may reconstruct, based in part on the disparity vector for the respective CU, a coding block for the respective CU.

Similarly, in some examples (e.g., examples for 3D-AVC coding), for each respective macroblock of a slice of a picture of the video data, a video coder may set a DDV to an initial value, in response to determining that the respective macroblock is the first macroblock of a macroblock row of the picture or the respective macroblock is the first macroblock of the slice. In such examples, the video coder may perform an NBDV process that attempts to determine an available disparity vector for the respective macroblock. When performing the NBDV process does not determine an available disparity vector for the respective macroblock, the video coder may determine that the disparity vector for the respective macroblock is equal to the DDV. If the video coder is a video encoder, the video coder may generate, based in part on the disparity vector for the respective macroblock, an encoded representation of a coding block for the respective CU. If the video coder is a video decoder, the video coder may reconstruct, based in part on the disparity vector for the respective macroblock, a coding block for the respective macroblock.

In one example, this disclosure describes a method of decoding video data. The method comprises, for each respective CU of a slice of a picture of the video data, in response to determining that the respective CU is the first CU of a CTB row of the picture or the respective CU is the first CU of the slice, setting a DDV to an initial value. The method also comprises performing an NBDV process that attempts to determine an available disparity vector for the respective CU. Furthermore, the method comprises, when performing the NBDV process does not determine an available disparity vector for the respective CU, determining that the disparity vector for the respective CU is equal to the DDV. In addition, the method comprises reconstructing, based in part on the disparity vector for the respective CU, a coding block for the respective CU.

In another example, this disclosure describes a method of encoding video data. The method comprises, for each respective CU of a slice of a picture of the video data, in response to determining that the respective CU is the first CU of a CTB row of the picture or the respective CU is the first CU of the slice, setting a DDV to an initial value. Furthermore, the method comprises performing an NBDV process that attempts to determine an available disparity vector for the respective CU. In addition, the method comprises, when performing the NBDV process does not determine an available disparity vector for the respective CU, determining that the disparity vector for the respective CU is equal to the DDV. The method also comprises generating, based in part on the disparity vector for the respective CU, an encoded representation of a sample block for the respective CU.

In another example, this disclosure describes a device comprising a buffer storing decoded pictures and one or more processors configured such that, for each respective CU of a slice of a picture of video data, the one or more processors: in response to determining that the respective CU is the first CU of a CTB row of the picture or the respective CU is the first CU of the slice, set a DDV to an initial value; perform an NBDV process that attempts to determine an available disparity vector for the respective CU; and when performing the NBDV process does not determine an available disparity vector for the respective CU, determine that the disparity vector for the respective CU is equal to the DDV.

In another example, this disclosure describes a device comprising, for each respective CU of a slice of a picture of the video data: means for setting, in response to determining that the respective CU is the first CU of a CTB row of the picture or the respective CU is the first CU of the slice, a DDV to an initial value; means for performing an NBDV process that attempts to determine an available disparity vector for the respective CU; and means for determining, when performing the NBDV process does not determine an available disparity vector for the respective CU, that the disparity vector for the respective CU is equal to the DDV.

In another example, this disclosure describes a computer-readable data storage medium (e.g., a non-transitory computer-readable data storage medium) having instructions stored thereon that when executed cause one or more processors to, for each respective CU of a slice of a picture of video data, in response to determining that the respective CU is the first CU of a CTB row of the picture or the respective CU is the first CU of the slice, set a DDV to an initial value; perform an NBDV process that attempts to determine an available disparity vector for the respective CU; and when performing the NBDV process does not determine an available disparity vector for the respective CU, determine that the disparity vector for the respective CU is equal to the DDV.

In another example, this disclosure describes a method of decoding video data. The method comprises, for each respective macroblock of a slice of a picture of the video data: in response to determining that the respective macroblock is the first macroblock of a macroblock row of the picture or the respective macroblock is the first macroblock of the slice, setting a DDV to an initial value. The method also comprises performing an NBDV process that attempts to determine an available disparity vector for the respective macroblock. Furthermore, the method comprises when performing the NBDV process does not determine an available disparity vector for the respective macroblock, determining that the disparity vector for the respective macroblock is equal to the DDV. In addition, the method comprises reconstructing, based in part on the disparity vector for the respective macroblock, a sample block for the respective macroblock.

In another example, this disclosure describes a method of encoding video data. The method comprises, for each respective macroblock of a slice of a picture of the video data, in response to determining that the respective macroblock is the first macroblock of a macroblock row of the picture or the respective macroblock is the first macroblock of the slice, setting a DDV to an initial value. Furthermore, the method comprises performing an NBDV process that attempts to determine an available disparity vector for the respective macroblock. In addition, the method comprises, when performing the NBDV process does not determine an available disparity vector for the respective macroblock, determining that the disparity vector for the respective macroblock is equal to the DDV. The method also comprises generating, based in part on the disparity vector for the respective macroblock, an encoded representation of a sample block for the respective macroblock. One or more devices, such as video encoders or decoders, may be configured to perform this method.

In another example, this disclosure describes a device comprising a buffer storing decoded pictures and one or more processors configured such that, for each respective macroblock of a slice of a picture of video data, the one or more processors: in response to determining that the respective macroblock is the first macroblock of a macroblock row of the picture or the respective macroblock is the first macroblock of the slice, set a DDV to an initial value (e.g., zero); perform an NBDV process that attempts to determine an available disparity vector for the respective macroblock; and when performing the NBDV process does not determine an available disparity vector for the respective macroblock, determine that the disparity vector for the respective macroblock is equal to the DDV.

In another example, this disclosure describes a device comprising: for each respective macroblock of a slice of a picture of video data, means for setting, in response to determining that the respective macroblock is the first macroblock of a macroblock row of the picture or the respective macroblock is the first macroblock of the slice, a DDV to an initial value (e.g., zero); means for performing an NBDV process that attempts to determine an available disparity vector for the respective macroblock; and means for determining, when performing the NBDV process does not determine an available disparity vector for the respective macroblock, that the disparity vector for the respective macroblock is equal to the DDV.

In another example, this disclosure describes a computer-readable data storage medium (e.g., a non-transitory computer-readable data storage medium) having instructions stored thereon that when executed cause, for each respective macroblock of a slice of a picture of video data, one or more processors: in response to determining that the respective macroblock is the first macroblock of a macroblock row of the picture or the respective macroblock is the first macroblock of the slice, set a DDV to an initial value (e.g., zero); perform an NBDV process that attempts to determine an available disparity vector for the respective macroblock; and when performing the NBDV process does not determine an available disparity vector for the respective macroblock, determine that the disparity vector for the respective macroblock is equal to the DDV.

The details of one or more examples of the disclosure are set forth in the accompanying drawings and the description below. Other features, objects, and advantages will be apparent from the description, drawings, and claims.

DETAILED DESCRIPTION

Figure 1:
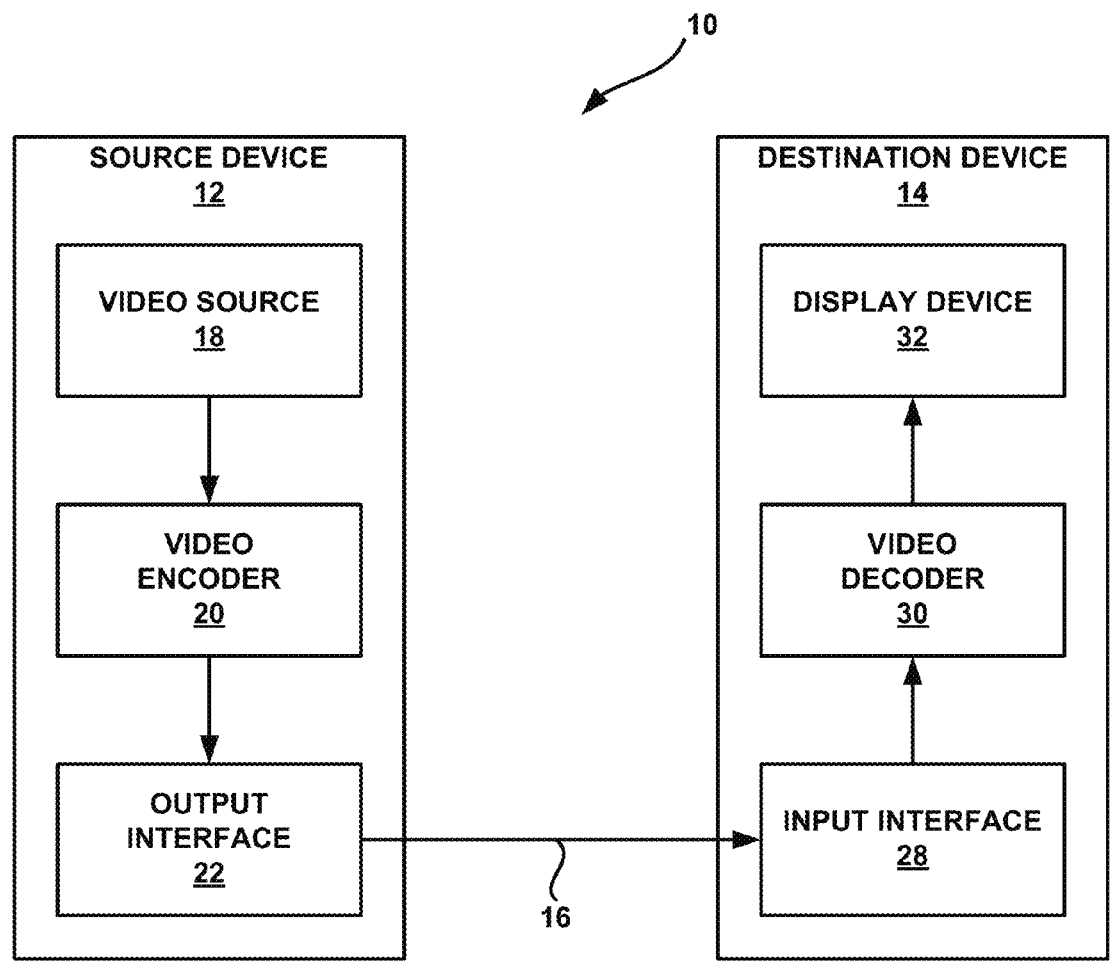
FIG. 1 is a block diagram illustrating an example video coding system that may utilize the techniques described in this disclosure.

In general, this application describes techniques for determining disparity vectors in multi-view video coding (e.g. 3-dimensional video coding). In multi-view video coding, the video content of different views may represent different perspectives. For example, a video block in a picture in a first view may include video content that is similar to a video block in a picture in a second view. In this example, the location of the video block in the picture in the first view and the location of the video block in the picture in the second view may be different. For example, there may be some displacement (i.e., disparity) between the locations of the video blocks in the different views. In multi-view video coding, inter-view prediction based on the reconstructed view components from different views may be enabled. Inter-view prediction may achieve coding gains by exploiting the fact that the pictures of each view that represent the same time instance of video may include similar video content.

When a video block of a current picture is coded using inter-view prediction, the block may have a motion vector that indicates a location in an inter-view reference picture. An inter-view reference picture may be a reference picture that is in (i.e., associated with) the same time instance as a current picture, but is in (i.e., associated with) a different view than the current picture. If a motion vector of a block indicates a location in an inter-view reference picture, the motion vector may be referred to as a disparity motion vector. A video coder (e.g., a video encoder or a video decoder) may use a disparity motion vector of a current block to determine a predictive block for the current block. If the video coder is a video encoder, the video coder may use the predictive block for the current block to generate residual data for the current block. If the video coder is a video decoder, the video coder may use the predictive block for the current block and residual data for the current block to reconstruct sample values for the current video block.

Furthermore, a block in a particular picture may have motion information or residual data that is similar to the motion information or residual data of a corresponding block in an inter-view reference picture. Accordingly, a video coder may predict the motion information or residual data of a current block in a current picture based on motion information or residual data of a corresponding block in an inter-view reference picture. The video coder may determine a disparity vector for the current block in order to determine a location of the corresponding block within the inter-view reference picture. The video coder may predict the motion information or residual data of the current block based on the motion information or residual data of the corresponding block in the inter-view reference picture regardless of whether the current block has a disparity motion vector. Thus, if the motion information or residual data of a current block is predicted based on the motion information or residual data of a corresponding block in an inter-view reference picture, the current block is said to have a disparity vector. The disparity vector may be referred as to an implicit disparity vector (IDV) when the disparity vector is used for disparity vector derivation process of blocks coded later. The disparity vector for the current block may be equal to the disparity vector for one of the previous blocks.

The video coder may use a neighboring block-based disparity vector (NBDV) derivation process to derive a disparity vector for a current block. In the NBDV derivation process, the video coder may check blocks that neighbor the current block. The neighboring blocks may include spatial neighboring blocks and temporal neighboring blocks. The spatial neighboring blocks are in the same picture as the current block (i.e., the current picture). The temporal neighboring blocks are in one or more pictures other than the current picture. When the video coder checks a neighboring block, the video coder may determine whether the neighboring block has a disparity motion vector. When the video coder determines that one of the neighboring blocks has a disparity motion vector, the video coder may stop checking neighboring blocks and may convert the disparity motion vector of the neighboring block into the disparity vector for the current block. Furthermore, if none of the neighboring blocks has a disparity motion vector, the video coder may determine whether any of the spatial neighboring blocks has an IDV. When the video coder determines that one of the spatial neighboring blocks has an IDV, the video coder may stop checking neighboring blocks and may convert the IDV of the neighboring block into the disparity vector for the current block.

The use of IDVs in the NBDV derivation process may require a significant increase in storage requirements and number of memory accesses. To address this and other issues, the use of derived disparity vectors (DDVs) was proposed. In at least some such proposals, a single DDV is stored for a slice. A video coder may set the disparity vector of a block to the DDV for the slice when none of the temporal or spatial neighboring blocks of the block has a disparity motion vector. After coding the block, the video coder may update the DDV for the slice to the disparity vector for the block. In this way, the DDV for the slice may be updated in coding (e.g., decoding) order. Thus, the DDV used for a coding a next block may depend on the disparity vector determined for the previous block.

This dependency may give rise to several issues. For example, in some video coding standards (e.g., H.264/AVC), if context-adaptive variable length coding (CAVLC) entropy coding is used, some types of decoders may be able to decode multiple macroblock rows in parallel, with a particular delay. In this example, updating the DDV for the slice in coding order may prevent the decoders from decoding multiple macroblock rows in parallel. In another example, when wavefront parallel processing (WPP) is enabled in some video coding standards (e.g., High Efficiency Video Coding), a coding unit (CU) should not depend on a last CU in a previous coding tree block (CTB) row. Updating the DDV for the slice in coding order (e.g., a raster scan order) may create a dependency on a CU in a previous CTB row. In another example, it may be less efficient to use a DDV derived from a block (e.g., a CU) of a previous row if the block is horizontally distant from a current block of a current row. Updating the DDV for the slice in coding order may result in the use of a DDV derived from a block that is horizontally distance from the current block.

One or more of the techniques described in this disclosure may address one or more of the issues mentioned above. For example, a video coder may perform the following actions for each respective block (e.g., CU, macroblock, etc.) of a slice of a picture of video data. In response to determining that the respective block is the first block of a block row (e.g., CTB row, macroblock row, etc.) of the picture or the respective block is the first block of the slice, the video coder may set a DDV to an initial value (e.g., zero). Additionally, the video coder may perform an NBDV process that attempts to determine a disparity vector for the respective block. When performing the NBDV process does not identify an available disparity vector for the respective block, the video coder may determine that the disparity vector for the respective block is equal to the DDV. In some examples, the video coder may generate, based in part on the disparity vector for the respective CU, an encoded representation of a coding block for the respective CU. Furthermore, in some examples, the video coder may reconstruct, based in part on the disparity vector for the respective CU, a coding block for the respective CU.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device (e.g., via streaming or download). The file server may be a type of server capable of storing encoded video data and transmitting the encoded video data to destination device 14. Example file servers include web servers (e.g., for a website), hypertext transfer protocol (HTTP) streaming server, file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data) is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data (e.g., video data) to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium, such as, e.g., a storage medium remotely accessible via a file server or streaming server or a locally accessible storage device, in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. A joint draft of the MVC extension of H.264/AVC is described in "Advanced video coding for generic audio visual services," ITU-T Recommendation H.264, March 2010. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In some examples (e.g., the example of FIG. 1), video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 10" is described in Bross et al., "High Efficiency Video Coding (HEVC) text specification draft 10," Joint Collaborative Team on Video Coding (JCT-VC) of ITU-T SG16 WP3 and ISO/IEC JTC1/SC29/WG11, 12$^{th}$ Meeting, Geneva, Switzerland, January 2013. At least as of May 9, 2014, HEVC Working Draft 10 is available from http://phenix.it-sudparis.eu/jct/doc_end_user/documents/12_Geneva/wg11/JCTVC-L1003-v34.zip.

Furthermore, there are ongoing efforts to produce scalable video coding, multi-view coding, and 3DV extensions for HEVC. The SVC extension of HEVC may be referred to as SHEVC. The 3DV extension of HEVC may be referred to as HEVC-based 3DV or 3D-HEVC. 3D-HEVC is based, at least in part, on solutions proposed in Schwarz et al, "Description of 3D Video Coding Technology Proposal by Fraunhofer HHI (HEVC compatible configuration A), ISO/IEC JTC1/SC29/WG11, Doc. MPEG11/M22570, Geneva, Switzerland, November/December 2011, hereinafter "m22570" and Schwarz et al, "Description of 3D Video Coding Technology Proposal by Fraunhofer HHI (HEVC compatible configuration B), ISO/IEC JTC1/SC29/WG11, Doc. MPEG11/M22571, Geneva, Switzerland, November/December 2011, hereinafter "m22571." A reference software description for 3D-HEVC is available at Schwarz et al, "Test Model under Consideration for HEVC based 3D video coding," ISO/IEC JTC1/SC29/WG11 MPEG2011/N12559, San Jose, USA, February 2012. Reference software, namely HTM version 3.0 is available, at least as of May 9, 2014, from https://hevc.hhi.fraunhofer.de/svn/svn_3DVCSoftware/tags/HTM-3.0/.

In H.264/AVC, HEVC, and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

In H.264/AVC, each picture may be partitioned into a set of macroblocks (MBs). A macroblock is a 16×16 block of luma samples and two corresponding blocks of chroma samples of a picture that has three sample arrays, or a 16×16 block of samples of a monochrome picture or a picture that is coded using three separate color planes.

Video encoder 20 may encode macroblocks using inter predictor or intra prediction. When video encoder 20 encodes a macroblock using inter prediction, video encoder 20 generates one or more predictive blocks for the macroblock based on samples of one or more pictures other than the current picture (i.e., the picture containing the macroblock). A macroblock encoded using inter prediction may be referred to as an inter macroblock. When video encoder 20 encodes a macroblock using intra prediction, video encoder 20 generates one or more predictive blocks for the macroblock based on samples in the current picture. A macroblock encoded using intra prediction may be referred to as an intra macroblock.

In H.264/AVC, each inter macroblock may be partitioned in one of four different ways:
One 16×16 macroblock partition
Two 16×8 macroblock partitions
Two 8×16 macroblock partitions
Four 8×8 macroblock partitions Different macroblock (MB) partitions in one MB may have different reference index values for each direction (i.e., RefPicList0 or RefPicList1). A reference index value may be a value indicating a reference picture in a reference picture list. When an MB is not partitioned into four 8×8 MB partitions, the MB may have only one motion vector for the whole MB partition in each direction.

When an MB is partitioned into four 8×8 MB partitions, each 8×8 MB partition can be further partitioned into sub-blocks. There are four different ways to get sub-blocks from an 8×8 MB partition:
One 8×8 sub-block
Two 8×4 sub-blocks
Two 4×8 sub-blocks
Four 4×4 sub-blocks Each sub-block can have a different motion vector in each direction. Partitions of an 8×8 MB partition are referred to as sub-block partitions.

As mentioned above, multi-view coding (MVC) is an extension of H.264/AVC. In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Figure 2:
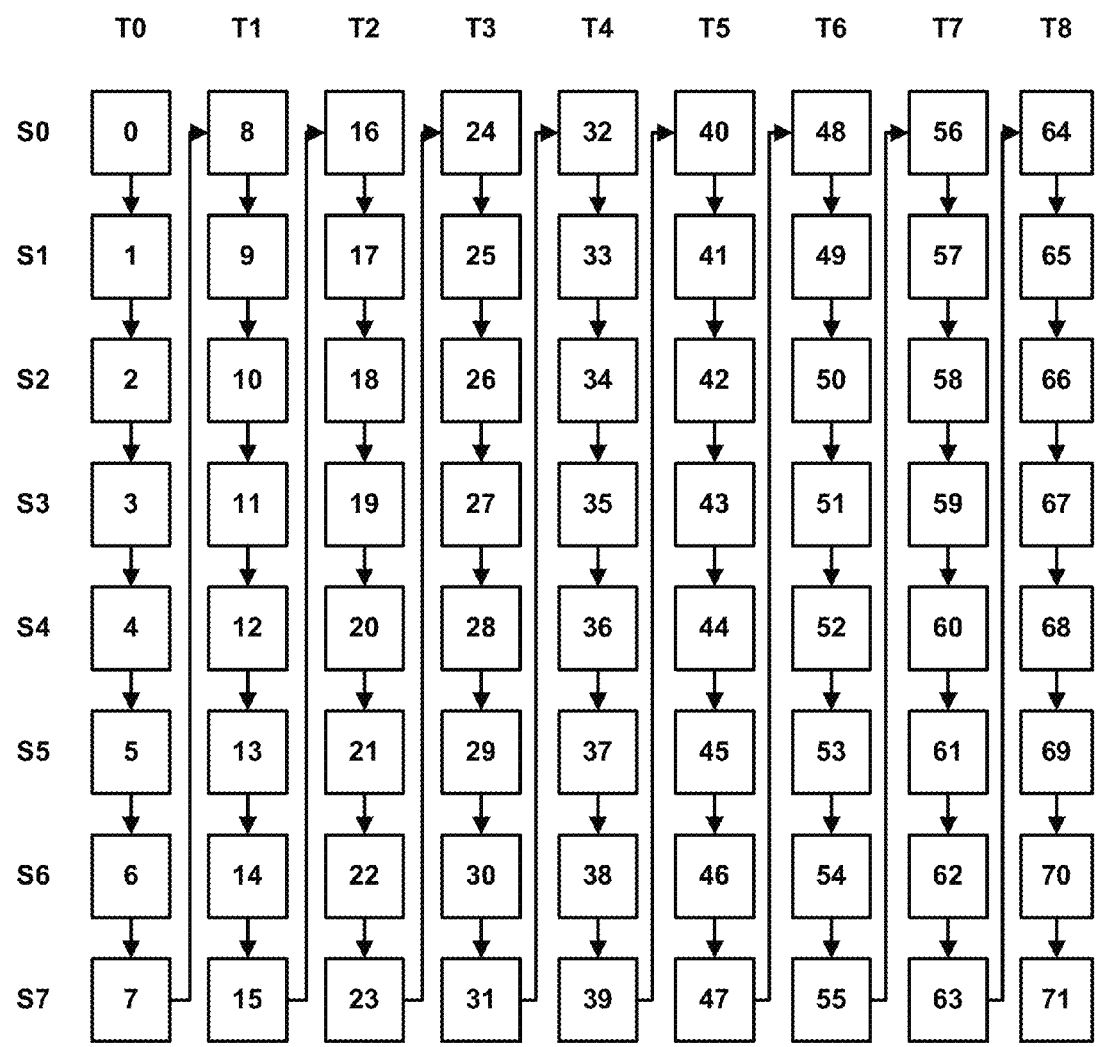
FIG. 2 is a conceptual diagram illustrating an example multi-view coding decoding order.

FIG. 2 is a conceptual diagram illustrating an example multi-view decoding order. The multi-view decoding order may be a bitstream order. In the example of FIG. 2, each square corresponds to a view component. Columns of squares correspond to access units. Each access unit may be defined to contain the coded pictures of all the views of a time instance. Rows of squares correspond to views. In the example of FIG. 2, the access units are labeled T0 . . . T8 and the views are labeled S0 . . . S7. Because each view component of an access unit is decoded before any view component of the next access unit, the decoding order of FIG. 2 may be referred to as time-first coding. The decoding order of access units may not be identical to the output or display order of the views.

More specifically, a texture view component (i.e., a texture picture) may be a coded representation of the texture of a view in a single access unit. The texture view component includes the actual image content to be displayed. For example, the texture view component may include luma (e.g., Y) and chroma (e.g., Cb and Cr) components. A texture view may be a sequence of texture view components associated with an identical value of a view order index. A view order index of a view may indicate a camera position of the view relative to other views.

One or more of the techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma sampling formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

A depth view component (i.e., a depth picture) may be a coded representation of the depth of a view in a single access unit. A depth view may be a sequence of depth view components associated with an identical value of a view order index. The depth view component may indicate relative depths of the pixels in its corresponding texture view component. As one example, the depth view component is a gray scale image that includes only luma values. In other words, the depth view component may not convey any image content, but rather may provide a measure of the relative depths of the pixels in the texture view component.

In some examples, a purely white pixel in a depth view component indicates that its corresponding pixel or pixels in a corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a dark gray pixel in a depth view component may indicate that a corresponding pixel in a texture view component is further away than a light gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting.

In other examples, any technique may be utilized to indicate relative depths of the pixels in the texture view component.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and may use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, video encoder 20 signals video data for the texture view components and the corresponding depth view components for each of the views. Video decoder 30 may utilize both the video data of texture view components and the depth view components to decode the video content of the views for display. A display then displays the multi-view video to produce 3D video.

Referring back to FIG. 2, each of the views includes sets of pictures. For example, view S0 includes a set of pictures 0, 8, 16, 24, 32, 40, 48, 56, and 64, view S1 includes a set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

Multi-view coding may support inter-view prediction. Inter-view prediction is similar to the inter prediction used in H.264/AVC, HEVC, or other video coding standards and may use the same syntax elements. However, when a video coder performs inter-view prediction on a current video unit (such as a macroblock), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views (i.e., dependent views), a video coder (such as video encoder 20 or video decoder 30) may add a picture into a reference picture list (e.g., RefPicList0 or RefPicList1) if the picture is in a different view but within a same time instance (i.e. access unit) as the picture that the video coder is currently coding. Like other inter prediction reference pictures, the video coder may insert an inter-view prediction reference picture at any position of a reference picture list.

Figure 3:
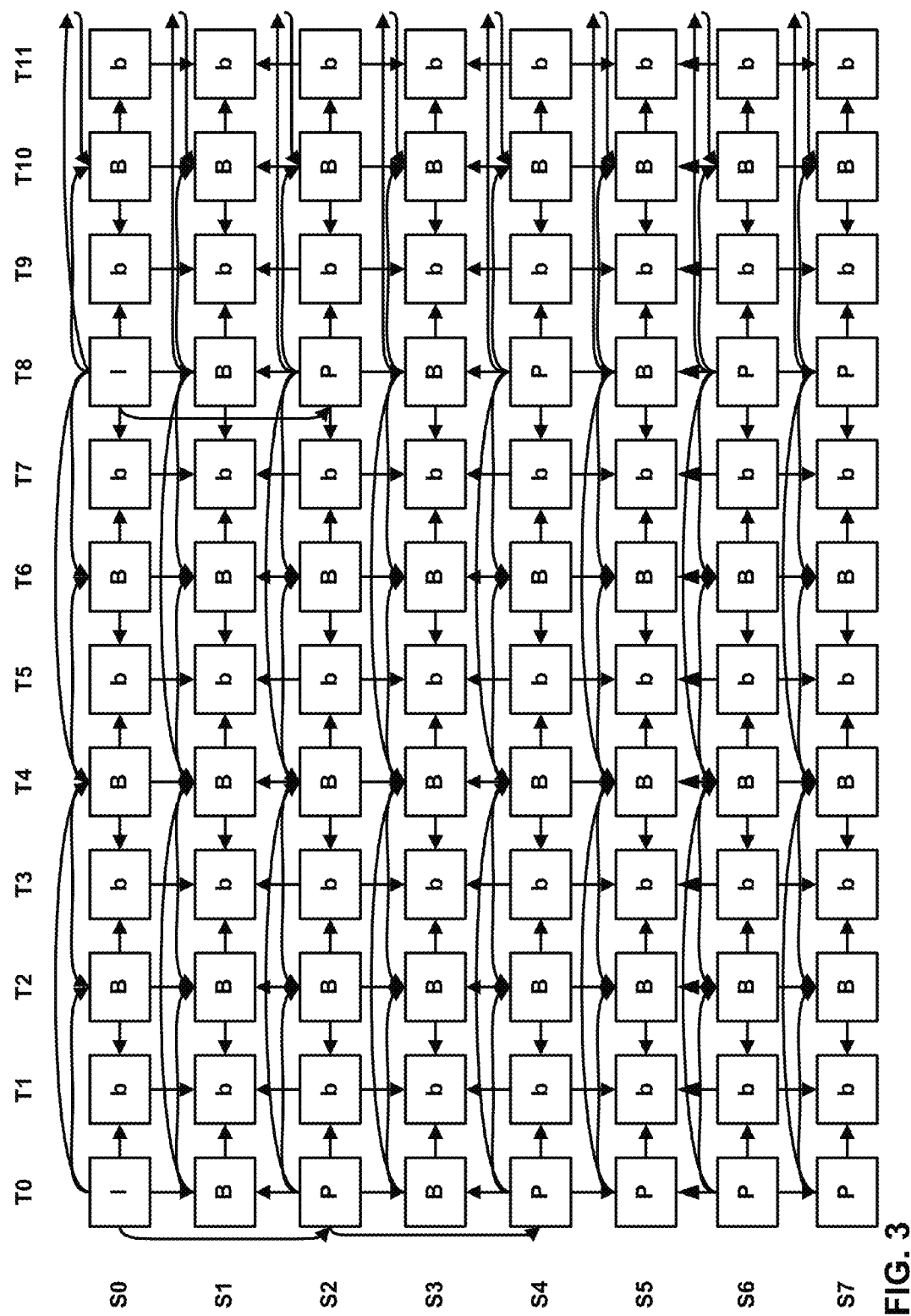
FIG. 3 is a conceptual diagram illustrating an example prediction structure for multi-view coding.

FIG. 3 is a conceptual diagram illustrating an example prediction structure for multi-view coding. The multi-view prediction structure of FIG. 3 includes temporal and inter-view prediction. In the example of FIG. 3, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 3, view components in different views of the same access unit may be available as reference pictures. The use of one view component of an access unit as a reference picture for another view component of the same access unit may be referred to as inter-view prediction. Thus, a typical MVC prediction (including both inter-picture prediction within each view and inter-view prediction) structure for multi-view video coding is shown in FIG. 3, where predictions are indicated by arrows, the pointed-to object using the point-from object for prediction reference.

In the MVC extension of H.264/AVC, inter-view prediction may be supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

In the MVC extension of H.264/AVC, inter-view prediction is allowed among pictures in the same access unit (i.e., with the same time instance). In other words, in MVC, inter-view prediction is performed among pictures captured from different views of the same access unit (i.e., with the same time instance) to remove correlation between views. When coding a picture in one of the non-base views, a picture may be added into a reference picture list, if the picture is in a different view but with a same time instance. In other words, a picture coded with inter-view prediction may be added into a reference picture list for the inter-view prediction of the other non-base views. An inter-view prediction reference picture can be put in any position of a reference picture list, just like any inter prediction reference picture.

In the context of multi-view video coding, there are two kinds of motion vectors. One kind of motion vector is a normal motion vector that points to a temporal reference picture (i.e., a picture in a different time instance than a current picture). The type of inter prediction corresponding to a normal, temporal motion vector may be referred to as "motion-compensated prediction" or "MCP." When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

As mentioned above, a Joint Collaborative Team on 3D Video Coding (JCT-3V) of VCEG of MPEG is developing a 3D video coding standard based on H.264/AVC, i.e., 3D-AVC. For 3D-AVC, new coding tools besides the inter-view prediction in MVC have been included and supported. The latest software 3D-ATM for 3D-AVC can be downloaded from the following link:
[3D-ATM version 6.2]: http://mpeg3dv.research.nokia.com/svn/mpeg3dv/tags/3DV-ATMv6.2/

The AVC based 3D video (3D-AVC) coding standard is currently under development by the JCT-3V. A version of 3D-AVC is now publicly available as follows:
M. M. Hannuksela, Y. Chen, T. Suzuki, J.-R. Ohm, G. J. Sullivan, "3D-AVC draft text 5," JCT3V-C1002, Geneva, C H, January 2013. At least as of May 9, 2014, this document is available from the following link: http://phenix.it-sudparis.eu/jct2/doc_end_user/documents/3_Geneva/wg11/JCT3V-C1002-v3.zip The next section of this disclosure discusses the AVC-based 3D video coding standard (i.e., 3D-AVC). A coding order of view components in 3D-AVC is discussed below. 3D-AVC is compatible with H.264/AVC in a way that the texture part of the base view is fully decodable for a H.264/AVC decoder. For enhanced view components in 3D-AVC, the depth may be coded prior to the texture and a texture view component may be coded based on the information from the depth view component, which is also known as depth-first coding. In contrast, each texture view component is coded before the respective depth view components in texture-first coding orders. For example, the coding orders of the texture and depth view components in the 3D-AVC may be exemplified as follows; wherein T0 and D0, respectively, refer to the texture and depth view components of the base view, and Ti and Di, respectively, refer to the texture and depth view components of the i-th dependent view. In the following examples, there are three views:
T0 D0 D1 D2 T1 T2: The base views (T0 and D0) are coded with the texture-first coding order while the dependent view is coded with the depth-first coding order. Hybrid coding order is currently used in common test conditions of 3D-AVC.
T0 D0 T1 D1 T2 D2: All the view components are coded with the texture-first coding order.

If inter-view prediction is enabled for Ti, the reference texture view is defined as the view that includes the inter-view reference picture and the corresponding depth view is defined as the reference depth view that has the same view order index as that of the reference texture view.

A video coder may use a disparity vector (DV) as an estimator of the disparity between two views. Because neighboring blocks share almost the same motion/disparity information in video coding, the current block can use the motion vector information in neighboring blocks as a good predictor. 3D-AVC disparity vector derivation via the depth map is now discussed. Techniques for deriving the disparity vector may vary with each low-level coding tool, but, commonly, the depth data of the dependent views is employed for the texture view component coding owing to the depth-first coding order.

An in-loop block-based view synthesis inter-view prediction (BVSP) and depth-based motion vector prediction (D-MVP) in 3D-AVC are the low-level coding tools, mainly, using the disparity vector converted from the depth values of the depth map in the dependent frame (e.g., a picture that relies on BVSP or D-MVP for decoding). Typically, in the 3D-AVC software, the results of the conversion process from the actual depth map value to a disparity to a particular view are stored in look-up tables with camera parameters.

BVSP was originally proposed in Wenyi Su et al., "3DV-CE1.a: Block-based View Synthesis Prediction for 3DV-ATM," Joint Collaborative Team on 3D Video Coding Extension Development of ITU-T SG 16 WP 3 and ISO/IEC JTC 1/SC 29/WG 11, $1^{st}$ meeting, Stockholm, Sweden, 16-20 Jul. 2012, document JCT3V-A0107 (hereinafter, "JCT3V-A0107"). At least as of May 9, 2014, JCT3V-A0107 can be downloaded from: http://phenix.it-sudparis.eu/jct2/doc_end_user/documents/1_Stockholm/wg11/JCT3V-A0107-v1.zip.

Figure 4:
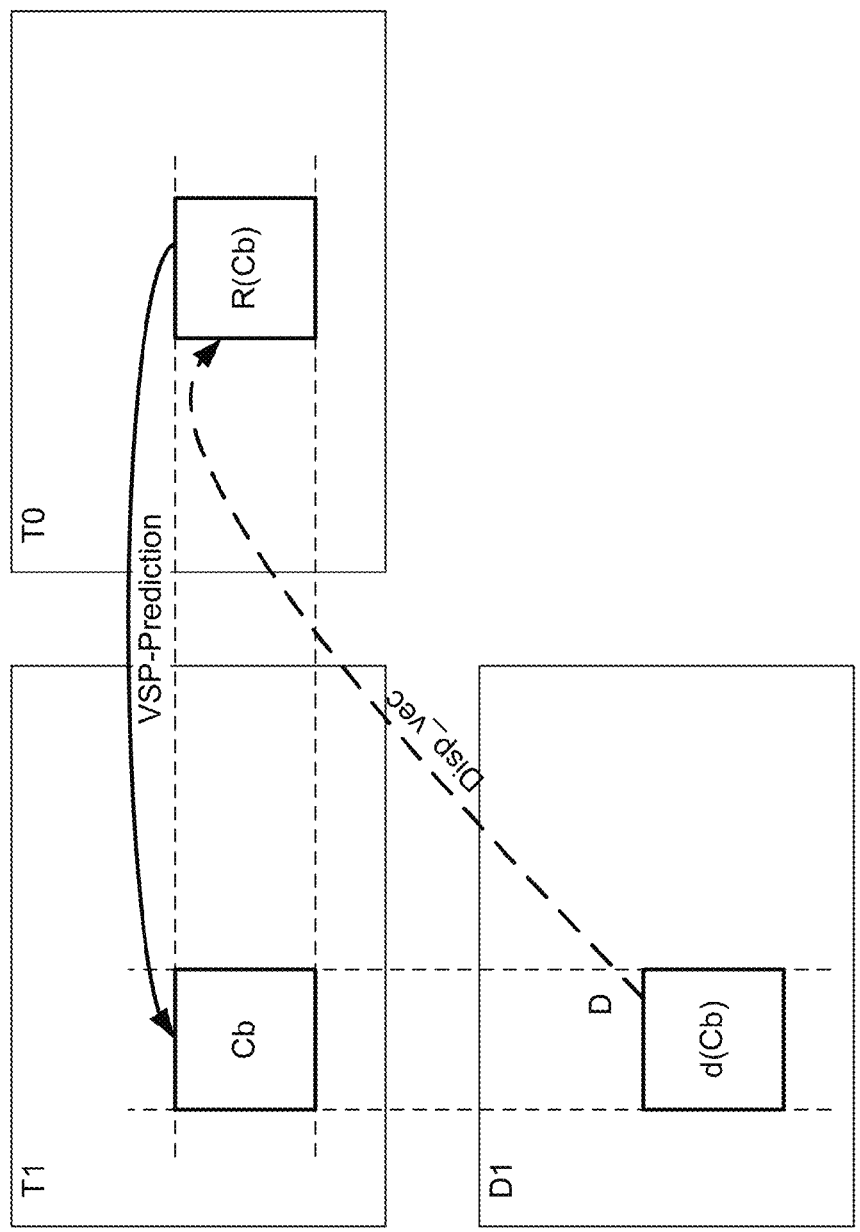
FIG. 4 is a conceptual diagram of an example visualization of block-based view synthesis prediction (B-VSP) based on backward warping.

FIG. 4 is an example conceptual visualization of BVSP based on backward warping. Referring to FIG. 4, assume that the following coding order is utilized: (T0, D0, D1, T1). Texture component T0 is a base view, and T1 is a dependent view coded with the VSP. Depth map components D0 and D1 are respective depth maps associated with T0 and T1. For ease of explanation, depth map component D0 is omitted from the example of FIG. 4.

In dependent view T1, sample values of current block Cb are predicted from reference area R(Cb) that consists of sample values of the base view T0. The displacement vector between coded and reference samples is denoted as a derived disparity vector between T1 and T0 from a depth map value associated with a currently coded texture sample.

In some examples, a video coder may use the following equations to perform a process of conversion from a depth value to a disparity vector:

$$Z(Cb(j, i)) = \frac{1}{\frac{d(Cb(j, i))}{255} \cdot \left(\frac{1}{Z_{near}} - \frac{1}{Z_{far}}\right) + \frac{1}{Z_{far}}}; \quad (1)$$

-continued $$D(Cb(j, i)) = \frac{f \cdot b}{Z(Cb(j, i))}; \quad (2)$$

where j and i are local spatial coordinates within Cb, d(Cb(j,i)) is a depth map value in a depth map image of a view #1, Z is the actual depth value of d(Cb(j,i)), and D is the horizontal component of a derived disparity vector to a particular view #0. The parameters f, b, Znear and Zfar are parameters specifying the camera setup, i.e., the used focal length (f), camera separation (b) between view #1 and view #0, and depth range (Znear, Zfar) represent parameters of depth map conversion.

In some examples, the vertical component of the derived disparity vector is always set equal to 0. In a current implementation of 3D-AVC (i.e., a 3DV-ATM implementation), equations (1) and (2) have already been pre-computed for every depth map value (0 . . . 255) and stored as a look-up table. Thus, a video coder may use the look-up table to convert depth values to disparity vectors without calculating equations (1) and (2) provided above.

One implementation issue related to BVSP involves the indication of BVSP blocks (i.e., blocks coded using BVSP). BVSP blocks may also be referred to herein as BVSP coded blocks. In some examples, BVSP blocks are indicated as follows. One flag at the macroblock (MB) level signals whether a current MB is coded with the conventional skip/direct mode or whether the current MB is coded with the skip/direct mode but predicted from a synthetic reference component. For each MB partition (from 16×16 to 8×8), a reference index corresponding to a reference picture list signals a reference picture in the reference picture list. When a video encoder uses BVSP mode to encode an MB partition, the video encoder does not signal the motion vector differences (MVDs) for the MB partition because there are no motion vectors for BVSP coded blocks. When either the flag or a reference index indicates that an MB partition is coded using a synthetic reference component, a video coder may invoke the prediction of one partition as described below.

Another implementation issue related to BVSP involves the prediction derivation process. N×M may denote the size of a MB partition, where N or M is equal to 8 or 16. If the MB partition is coded with BVSP mode, the MB partition is further partitioned into several sub-regions with the size equal to K×K, where K may be 4×4, 2×2 or 1×1. For each sub-region of the MB partition, a video coder derives a separate derived disparity vector. Furthermore, for each respective sub-region of the MB partition, the video coder uses the derived disparity vector to locate a corresponding block in the inter-view reference picture, i.e., R(cb) in FIG. 4. The video coder may predict the respective sub-region from the corresponding block for the respective sub-region. One example of BVSP is based on backward warping for blocks with a size of 4×4 (meaning K is equal to 4.) The derived disparity vectors are not stored for BVSP coded blocks because there are no coding tools that use such vectors.

Another implementation issue involves the disparity vector derivation process. When a depth first coding order is applied, a video coder may obtain the derived disparity vector by converting a depth value of the corresponding depth block in the corresponding non-base depth view, as shown in FIG. 4. Several techniques may be applied to select the depth value of one depth block, such as the depth value of the center position of the depth block, the maximum value of all depth values within one depth block, the maximum value of four corner pixels within one depth block, and the depth value of the bottom-right pixel of the depth block/depth MB. When texture first coding order is applied, the video coder may disable BVSP modes because the corresponding non-base depth view is unavailable when decoding the non-base texture view.

Depth-based motion vector prediction (D-MVP) in 3D-AVC for normal inter modes is now be discussed. D-MVP is a motion vector prediction method incorporating associated depth map data in the current view, which is available due to the depth-first coding order. A video coder may apply D-MVP with the texture view components in dependent (i.e., non-base) views.

In 3D-AVC, the D-MVP method is incorporated into the conventional median function-based motion vector prediction in H.264/AVC. Specifically, the type of motion vector to be predicted (i.e., whether temporal motion vector or disparity motion vector) is first identified in a way that reference indices of the motion vectors in neighboring blocks are checked to know the type of motion prediction.

The neighboring blocks include, in order, a left block, an above block, an above-right block, and an above-left block relative to the current block. In some examples, a video coder may only use the motion vector in the above-left block when one of the other three neighboring blocks (i.e., the left block, the above block, and the above-right block) does not contain a motion vector, and is thus considered as unavailable.

Afterwards, if three neighboring blocks are available, the video coder may employ the motion vectors in the three neighboring blocks for the motion vector prediction of motion vectors for the current block. In temporal prediction, if the motion vectors of the three neighboring blocks all have the same type and all have the same reference indices, the video coder may use a median filter directly as described in H.264/AVC. Otherwise (if the motion vectors of the three neighboring blocks belong to different types and the three neighboring blocks have the different reference indices), the video coder may further derive a motion vector for the current block. When the current reference picture is an inter-view reference picture, the video coder may check the motion vector types and their reference indices in neighboring block positions. If the motion vectors have all the same type and the same reference indices, the video coder may apply the median filter. In both cases, if less than three neighboring blocks are available, the video coder may further derive motion vectors for the unavailable blocks so that three neighboring blocks become available.

A motion vector derived for a neighboring block may be referred to as a derived motion vector. To derive a motion vector of a current block, a video coder may determine whether a current motion vector (i.e., a motion vector of a neighboring block) is a disparity motion vector, whether the motion vector of the neighboring block has a different type than the type of the current motion vector, or whether the motion vector of the neighboring block is unavailable. If any of these conditions applies, the video coder may set the derived motion vector of the current block to be a disparity motion vector, which the video coder may convert from the corresponding depth view component. The video coder may convert the maximum value of the depth values of the four corners of the corresponding block of the depth view component of the same view to a disparity value. The video coder may set the disparity value to the horizontal component of the derived motion vector. The video coder may set the vertical component of the derived motion vector to be zero.

If the current motion vector is a temporal motion vector, the video coder may use the disparity value (derived similarly as mentioned above) to determine a temporal motion vector of the reference block in the reference (base) view. The video coder may set the derived motion vector to be the temporal motion vector. If the temporal motion vector is considered to be unavailable (e.g., the temporal neighboring block is an intra block or a motion vector of the temporal neighboring block does not point to a reference picture in the reference view aligned with the current reference picture), the video coder may set the derived motion vector to zero.

Inter-view motion prediction in 3D-AVC for skip and direct modes are now discussed. As described in sections 7.3.5 and 7.4.5 of the H.264/AVC specification, a macroblock_layer syntax structure for a macroblock may include an mb_type syntax element that specifies a macroblock type for the macroblock. The semantics of the mb_type syntax element depend on the slice type of the slice containing the macroblock. If the slice is a P slice, the macroblock types include a P_Skip type. When the macroblock type of a macroblock is P_Skip, no further data is present for the macroblock in the bitstream. If the slice is a B slice, the macroblock types include a B_Skip mode and a B_Direct_16×16 mode (i.e., a B-16×16 direct mode). When the macroblock type of a macroblock is B_Skip, no further data is present for the macroblock in the bitstream. When the macroblock type of a macroblock is B_Direct_16×16, no motion vector differences or reference indices are present for the macroblock in the bitstream. Furthermore, when the macroblock type of a macroblock is B_Direct_16×16, the functions MbPartWidth(B_Direct_16×16), and MbPartHeight(B_Direct_16×16) are used in the derivation process for motion vectors and reference frame indices in subclause 8.4.1 of the H.264/AVC specification for direct mode prediction.

Furthermore, a macroblock_layer syntax structure may include one or more sub_mb_pred syntax structures. A sub_mb_pred syntax structure may include four sub_mb_type syntax elements that specify sub-macroblock types. The sub-macroblock types include a B_Direct_8×8 mode (i.e., a B-8×8 direct mode). When the sub-macroblock type of a sub-macroblock is B_Direct_8×8, no motion vector differences or reference indices are present for the sub-macroblock in the bitstream. The functions SubMbPartWidth(B_Direct_8×8) and SubMbPartHeight(B_Direct_8×8) are used in the derivation process for motion vectors and reference frame indices in subclause 8.4.1 of the H.264/AVC specification for direct mode prediction.

A video coder may perform inter-view motion prediction in 3D-AVC in P-skip, B-skip, B-16×16 direct mode, and B-8×8 direct mode. To perform inter-view motion prediction, the video coder may first derive a disparity vector for a current block from the neighboring blocks, as well as the disparity vector converted from the depth values of the depth view component of the same view. If one available spatial neighboring block contains a disparity motion vector, the video coder may determine that this disparity motion vector is the disparity vector for the current block. Otherwise, when none of the neighboring blocks has a disparity motion vector, the video coder may convert a disparity motion vector of a block from the depth values (similar to the conversion in D-MVP). Afterwards, the video coder may apply a median filter to three neighboring blocks to determine the disparity vector for the current block.

The video coder may use the disparity vector for the current block to determine a temporal motion vector of the reference block in the reference (e.g., base) view. If the temporal motion vector is unavailable, the video coder may firstly derive the reference index and the video coder may apply D-MVP, as discussed above, to produce a motion vector predictor.

This disclosure now discusses HEVC. The following discussion of HEVC may also be applicable to other video coding standards and/or specifications. To generate an encoded representation of a picture, video encoder 20 may generate a set of coding tree units (CTUs). Each of the CTUs may comprise (e.g., be) a coding tree block of luma samples, two corresponding coding tree blocks of chroma samples, and syntax structures used to code the samples of the coding tree blocks. In at least some examples, a coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in a scanning order (e.g., a raster scan).

This disclosure may use the term "video unit" or "video block" or simply "block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." In at least some examples, a coding block is an N×N block of samples. A CU may comprise (e.g., be) a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block. A size of the CU generally corresponds to a size of a coding block of the CU and is typically square in shape. In some examples, the size of the CU ranges from 8×8 pixels up to the size of a CTU with a maximum size of 64×64 pixels or greater.

Video encoder 20 may partition a coding block of a CU into one or more prediction blocks. A prediction block may be a rectangular (i.e., square or non-square) block of samples on which the same prediction is applied. A prediction unit (PU) of a CU may comprise (e.g., be) a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block. A prediction block may be a rectangular (e.g., M×N, where M may or may not be equal to N) block of samples on which the same prediction is applied. Thus, PUs may be partitioned to be non-square in shape.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU (i.e., the picture containing a prediction block of the PU).

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks (i.e., predictive blocks) for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive blocks (e.g., luma, Cb and Cr predictive blocks) for one or more PUs of a CU, video encoder 20 may generate a residual block for the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). In at least some examples, a transform block is a rectangular block of samples on which the same transform is applied. A transform unit (TU) of a CU may comprise (e.g., be) a transform block of luma samples, two corresponding transform blocks of chroma samples, and syntax structures used to transform the transform block samples. Thus, each TU of a CU may have (i.e., be associated with) a luma transform block, a Cb transform block, and a Cr transform block. The luma transform block of (i.e., associated with) the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block. In this way, residual samples corresponding to a CU may be subdivided into smaller units using a quadtree structure known as a "residual quad tree" (RQT). The leaf nodes of the RQT may be referred to as TUs. Syntax data associated with a CU may also describe, for example, partitioning of the CU into one or more TUs according to a quadtree.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and may apply an inverse transform to the transform coefficients in order to reconstruct transform blocks of TUs of CUs of a picture. The video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Thus, video encoder 20 may comprise a buffer storing decoded pictures. Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

HEVC and other video coding standards provide for various types of parameter sets. For example, a video parameter set (VPS) is a syntax structure comprising syntax elements that apply to zero or more entire coded video sequences (CVSs). A sequence parameter set (SPS) may contain information that applies to all slices of a CVS. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream. In addition, video decoder 30 may parse the bitstream to obtain (e.g., decode) syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks of (i.e., associated with) the TUs of the current CU. Video decoder 30 may reconstruct the coding blocks of the current CU by adding the samples of the predictive sample blocks (i.e., predictive blocks) for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures. Thus, video decoder 30 may comprise a buffer storing decoded pictures.

When a video coder (e.g., video encoder 20 or video decoder 30) begins coding a current slice of a picture, the video coder may initialize a first reference picture list (i.e., List 0). Furthermore, if the current slice is a B slice, the video coder may initialize a second reference picture list (i.e., List 1). This disclosure may refer to List 0 as "RefPicList0" and may refer to List 1 as "RefPicList1." After a video coder has initialized a reference picture list (e.g., List 0 or List 1), the video coder may modify the order of the reference pictures in the reference picture list. In other words, the video coder may perform a reference picture list modification (RPLM) process. The video coder may modify the order of the reference pictures in any order, including the case where one particular reference picture may appear in more than one position in the reference picture list.

In some cases, video encoder 20 may signal the motion information of a PU using merge mode or advanced motion vector prediction (AMVP) mode. In other words, in HEVC, there are two modes for the prediction of motion parameters, one being the merge mode and the other being AMVP. The motion information of a PU may include motion vector(s) of the PU and reference index(es) of the PU. When video encoder 20 signals the motion information of a current PU using merge mode, video encoder 20 may generate a merge candidate list (i.e., a motion vector predictor (MVP) candidate list). In other words, video encoder 20 may perform a motion vector predictor list construction process. The merge candidate list includes a set of merge candidates (i.e., MVP candidates). The merge candidate list may include merge candidates that indicate the motion information of PUs that spatially or temporally neighbor the current PU. That is, in the merge mode, a candidate list of motion parameters (e.g., reference indexes, motion vectors, etc.) may be constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points are to be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may use, as a predictive block for the PU, a reference block indicated by the motion information of a selected candidate in the merge candidate list.

AMVP mode is similar to merge mode in that video encoder 20 generates a candidate list and selects a candidate from the list of candidates. However, when video encoder 20 signals the motion information of a current PU using AMVP mode, video encoder 20 also may signal a motion vector difference (MVD) for the current PU and a reference index in addition to signaling a position of the selected candidate in the candidate list. An MVD for the current PU may indicate a difference between a motion vector of the current PU and a motion vector of the selected candidate from the AMVP candidate list. In uni-prediction, video encoder 20 may signal one MVD and one reference index for the current PU. In bi-prediction, video encoder 20 may signal two MVDs and two reference indexes for the current PU. In this way, video encoder 20 may signal the selected motion vectors by transmitting an index into the candidate list and may signal the reference index values and MVDs. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a candidate list index. Video decoder 30 may generate the same AMVP candidate list and may determine, based on the indication of the position of the selected candidate in the AMVP candidate list, the selected candidate. Video decoder 30 may recover a motion vector of the current PU by adding a MVD to the motion vector indicated by the selected candidate. That is, video decoder 30 may determine, based at least in part on a motion vector indicated by the selected candidate and the MVD, the motion vector of the current PU. Video decoder 30 may then use the recovered motion vector or motion vectors of the current PU to generate predictive blocks for the current PU.

A candidate in a merge candidate list or an AMVP candidate list that is based on the motion information of a PU that temporally neighbors a current PU (i.e., a PU that is in a different time instance than the current PU) may be referred to as a temporal motion vector predictor (TMVP). To determine a TMVP, a video coder may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list.

A video coder may identify a co-located PU by checking the co-located picture. The TMVP may indicate either the motion information of a right-bottom PU of the CU containing the co-located PU, or the motion information of the right-bottom PU within the center PUs of the CU containing this PU. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a motion candidate for merge mode or AMVP mode, the motion vectors may be scaled based on the temporal location (e.g., reflected by picture order count (POC) value). For instance, a video coder may increase the magnitude of a motion vector by greater amounts when a difference between the POC values of a current picture and a reference picture is greater than when a difference between the POC values of the current picture and the reference picture is less.

WPP is a technique for increasing parallelism. If a video coder codes the picture using WPP, the video coder may divide the CTBs of the picture into a plurality of "WPP waves." Each of the WPP waves may correspond to a different row of CTBs in the picture. If the video coder codes the picture using WPP, the video coder may start coding a top row of CTBs. After the video coder has coded two or more CTBs of the top row, the video coder may start coding a second-to-top row of CTBs in parallel with coding the top row of CTBs. After the video coder has coded two or more CTBs of the second-to-top row, the video coder may start coding a third-to-top row of CTBs in parallel with coding the higher rows of CTBs. This pattern may continue down the rows of CTBs in the picture.

If the video coder is using WPP, the video coder may use information associated with spatially-neighboring CUs outside a current CTB to perform in-picture prediction on a particular CU in the current CTB, so long as the spatially-neighboring CUs are left, above-left, above, or above-right of the current CTB. If the current CTB is the leftmost CTB in a row other than the topmost row, the video coder may use information associated with the second CTB of the immediately higher row to select a context for CABAC coding one or more syntax elements of the current CTB. Otherwise, if the current CTB is not the leftmost CTB in the row, the video coder may use information associated with a CTB to the left of the current CTB to select a context for CABAC coding one or more syntax elements of the current CTB. In this way, the video coder may initialize CABAC states of a row based on the CABAC states of the immediately higher row after encoding two or more CTBs of the immediately higher row.

Thus, in response to determining that a first CTB is separated from a left boundary of the picture by a single CTB, a video coder may store context variables associated with the first CTB. The video coder may entropy code (e.g., entropy encode or entropy decode), based at least in part on the context variables associated with the first CTB, one or more syntax elements of a second CTB, the second CTB being adjacent to the left boundary of the picture and one row of CTBs lower than the first CTB.

Figure 5:
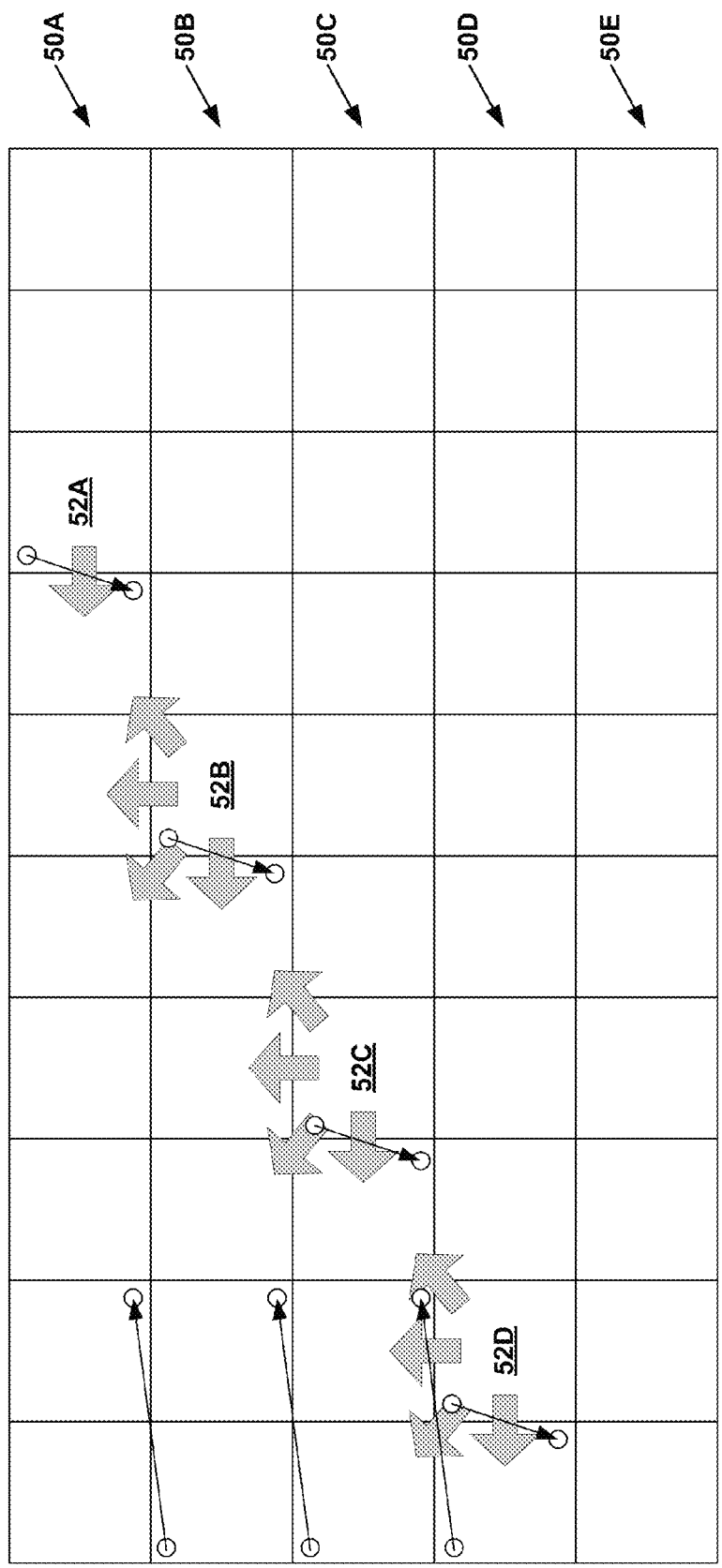
FIG. 5 is a conceptual diagram that illustrates an example of wavefront parallel processing (WPP).

FIG. 5 is a conceptual diagram that illustrates an example of WPP. As described above, a picture may be partitioned into pixel blocks, each of which is associated a CTB. FIG. 5 illustrates the pixel blocks associated with the CTBs as a grid of white squares. The picture includes CTB rows 50A-50E (collectively, "CTB rows 50").

A first parallel processing thread (e.g., executed by one of a plurality of parallel processing cores) may be coding CTBs in CTB row 50A. Concurrently, other threads (e.g., executed by other parallel processing cores) may be coding CTBs in CTB rows 50B, 50C, and 50D. In the example of FIG. 5, the first thread is currently coding a CTB 52A, a second thread is currently coding a CTB 52B, a third thread is currently coding a CTB 52C, and a fourth thread is currently coding a CTB 52D. This disclosure may refer to CTBs 52A, 52B, 52C, and 52D collectively as "current CTBs 52." Because the video coder may begin coding a CTB row after more than two CTBs of an immediately higher row have been coded, current CTBs 52 are horizontally displaced from each other by the widths of two CTBs.

In the example of FIG. 5, the threads may use data from CTBs indicated by the thick gray arrows to perform intra prediction or inter prediction for CUs in current CTBs 352. (The threads may also use data from one or more reference frames to perform inter prediction for CUs.) To code a given CTB, a thread may select one or more CABAC contexts based on information associated with previously-coded CTBs. The thread may use the one or more CABAC contexts to perform CABAC coding on syntax elements associated with the first CU of the given CTB. If the given CTB is not the leftmost CTB of a row, the thread may select the one or more CABAC contexts based on information associated with a last CU of the CTB to the left of the given CTB. If the given CTB is the leftmost CTB of a row, the thread may select the one or more CABAC contexts based on information associated with a last CU of a CTB that is above and two CTBs right of the given CTB. The threads may use data from the last CUs of the CTBs indicated by the thin black arrows to select CABAC contexts for the first CUs of current CTBs 52.

3D-HEVC provides for multiple views of the same scene from different viewpoints. Part of the standardization efforts for 3D-HEVC includes the standardization of the multiview video codec based on HEVC. In HEVC based 3DV (i.e., 3D-HEVC), inter-view prediction based on the reconstructed view components from different views is enabled. Like MVC in H.264/AVC, 3D-HEVC supports inter-view motion prediction (IMP). In 3D-HEVC, IMP is similar to the motion compensation used in standard HEVC and may utilize the same or similar syntax elements. However, when a video coder performs IMP on a PU, the video coder may use, as a reference picture, a picture that is in the same access unit as the PU, but in a different view. In contrast, conventional motion compensation only uses pictures in different access units as reference pictures. Thus, in 3D-HEVC, the motion parameters of a block in a dependent view may be predicted or inferred based on already coded motion parameters in other views of the same access unit.

In 3D-HEVC and other video coding standards, a video coder may generate a candidate list (e.g., a merge candidate list or an AMVP candidate list) when the motion information of a current PU is signaled using merge mode or AMVP mode. Furthermore, in 3D-HEVC and other video coding standards, the candidate list may include an inter-view prediction candidate that may be used in the same manner as other candidates in the candidate list. The inter-view prediction candidate specifies the motion information of a PU (i.e. a reference PU) of a reference picture. The reference picture is in the same access unit as the current PU, but is in a different view than the current PU. To determine the reference PU, the video coder may perform a disparity vector construction process to determine a disparity vector for the current PU. The disparity vector for the current PU may indicate a horizontal spatial displacement between the current PU and a location within the reference texture picture. The reference PU may be the PU of the reference texture picture that covers the location indicated by the disparity vector.

A disparity motion vector is a motion vector pointing to a location within an inter-view reference picture. An inter-view reference picture is a texture picture that is in the same access unit as a current PU, but in a different view. A spatial disparity vector (SDV) is a disparity motion vector of a PU that spatially neighbors the current PU. In other words, a SDV is a motion vector that is specified by a spatially-neighboring PU and that indicates a location in an inter-view reference picture, where the spatially-neighboring PU spatially neighbors a current PU. A temporal disparity vector (TDV) is a disparity motion vector of a PU co-located with the current PU, in the same view as the current PU, and in a different access unit than the current PU. In other words, a TDV may be a disparity motion vector from co-located PU, co-located LCU in any reference picture or inter-view picture with the same access unit. Alternatively, if the motion vector of the co-located PU from the picture used for TMVP or the motion vector generated by TMVP is a disparity vector, it is also treated as a TDV. If a spatially-neighboring or a temporally-neighboring PU of the current PU is coded using inter-view motion prediction, the disparity vector of the spatially-neighboring or temporally-neighboring PU is an IDV.

The video coder may use a selected disparity vector directly for IMP. As indicated above, a video encoder may generate motion vector predictor candidate lists (i.e., motion vector candidate lists) for the current PU when signaling the motion information of the current PU using merge/skip mode or AMVP mode. The video coder may use the disparity vector specified by the selected disparity vector candidate to determine a reference PU in an inter-view reference picture. The video coder may then include the motion information of the reference PU as the inter-view prediction motion vector candidate in the motion vector predictor candidate lists for merge mode or AMVP mode.

Furthermore, 3D-HEVC and other video coding standards may support inter-view residual prediction. In inter-view residual prediction, a video coder may determine residual blocks of a current block (e.g., CU) based on residual data in a different view than the current block. The video coder may use disparity vectors of the current block (or disparity vectors of sub-blocks of the current block (e.g., PUs)) to determine the residual data in the different view.

In some instances, a video coder may perform CU-level inter-view residual prediction (IVRP) based on a derived disparity vector for each CU. When the video coder performs IVRP for a current CU of a current picture, the video coder may use motion vectors of PUs of the current CU to determine a motion compensated block for the current CU. In other words, the motion compensated block for the current CU may comprise the predictive blocks of the PUs of the current CU. The motion compensated block of the current CU may be denoted as $P_e$. Each sample in a residual block ($r_e$) for the current CU may indicate a difference between a sample in an original coding block of the current CU and a corresponding sample in $P_e$. In addition, the video coder may use a disparity vector of the current CU to determine a disparity reference CU in a reference picture. The reference picture is in a different view than the current picture. A residual block of the disparity reference CU may be denoted as $r_b$. Each sample of the residual block of the disparity reference CU ($r_b$) may indicate a difference between an original sample of a coding block for the disparity reference CU and a corresponding predictive sample in a predictive block for a PU of the disparity reference CU.

Video encoder 20 may include, in the bitstream, data indicating a final residual block. Each sample in the final residual block may indicate a difference between a sample in $r_b$ and a corresponding sample in $r_e$. Therefore, when inter-view residual prediction is used, motion compensation can be expressed by the following equation:

$$\hat{I}_e = r_e + P_e + r_b$$

where the reconstruction of the current block $\hat{I}_e$ equals de-quantized coefficients $r_e$ plus prediction $P_e$ and quantization normalized residual coefficients $r_b$. Video coders may treat $r_b$ as the residual predictor. Thus, similar to motion compensation, $r_b$ may be subtracted from the current residual and only the resulting difference signal is transform coded.

Some video coders may implement so-called Advanced Residual Prediction (ARP). For instance, Zhang et al., "3D-CE5.h related: Advanced residual prediction for multiview coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, "JCT3V-B0051"), proposed an ARP method to further improve the coding efficiency of inter-view residual prediction.

As indicated above, inter-view motion prediction, inter-view residual prediction, and/or other inter-view coding techniques may rely on disparity vectors. Neighboring-block based disparity vector (NBDV) derivation is a process for determining a disparity vector for a block. NBDV is used for a disparity vector derivation method in the 3D-HEVC that uses the texture-first coding order for all the views. In at least some 3D-HEVC designs, the NBDV is also used to retrieve depth data from a reference view's depth map. A reference software description as well as a working draft of 3D-HEVC is available as follows: Gerhard Tech et al., "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012 (hereinafter, "JCT3V-B1005"). At least as of May 9, 2014, JCTV-B1005 is available from http://phenix.int-evry.fr/jct2/doc_end_user/documents/2_Shanghai/wg11/JCT3V-B1005-v1.zip.

A disparity vector is used for an estimator of the disparity between two views. Because neighboring blocks share almost the same motion/disparity information in video coding, the current block can use the motion vector information in neighboring blocks as a good predictor. Following this idea, the NBDV derivation process (i.e., the "NBDV process" or simply "NBDV") uses the neighboring disparity information for estimating the disparity vector in different views.

Several spatial and temporal neighboring blocks are firstly defined. Each of the spatial and temporal neighboring blocks is then checked in a pre-defined order determined by the priority of the correlation between the current block and the candidate block. Once a disparity motion vector (i.e., the motion vector points to an inter-view reference picture) is found in the candidates, the disparity motion vector is converted to a disparity vector. Two sets of neighboring blocks are utilized. One set is from spatial neighboring blocks and the other set is from temporal neighboring blocks. A video coder may use the NBDV derivation process as a disparity vector derivation method in 3D-HEVC and other video coding standards, which uses the texture-first coding order for all the views. In at least some 3D-HEVC designs, the video coder may also use the NBDV derivation process to retrieve depth data from a depth map of a reference view. 3D-HEVC first adopted the NBDV method proposed in Zhang et al., "Disparity vector generation results," Joint Collaborative Team on 3D Video Coding Extension Development of ITU-T SG 16 WP 3 and ISO/IEC JTC 1/SC 29/WG 11 1st Meeting: Stockholm, SE, 16-20 Jul. 2012, document JCT3V-A0097 (hereinafter, JCT3V-A0097). Implicit disparity vectors are included with a simplified NBDV in JCT3V-A0126: Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document no. JCT3V-A0126 (hereinafter, JCT3V-A0126). In addition, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0047 (hereinafter, JCT3V-B0047), the NBDV derivation process is further simplified by removing the implicit disparity vectors stored in the decoded picture buffer, while achieving an improved coding gain with the random access picture (RAP) selection.

In some NBDV derivation processes, a video coder uses five spatial neighboring blocks for disparity vector derivation. The five spatial neighboring blocks are the below-left, left, above-right, above and above-left blocks of a current PU, denoted by $A_0$, $A_1$, $B_0$, $B_1$ and $B_2$. The five spatial neighboring blocks used in the proposed NBDV derivation process may be the same five spatial neighboring blocks used in the merge modes in HEVC. Therefore, in some examples, no additional memory access is required to access the five spatial neighboring blocks.

For checking temporal neighboring blocks, a construction process of a candidate picture is performed first. All the reference pictures from the current view may be treated as candidate pictures. A co-located reference picture is first inserted into the candidate picture list, followed by the rest of the candidate pictures in the ascending order of reference index. When the reference pictures with the same reference index in both reference picture lists are available, the one in the same reference picture list of the co-located picture precedes the other one. For each candidate picture in the candidate picture list, three candidate regions are determined for deriving the temporal neighboring blocks.

When a video coder codes a block with inter-view motion prediction, the video coder may derive a disparity vector for selecting a corresponding block in a different view. The term "implicit disparity vector" or "IDV" (or in some circumstances a "derived disparity vector") may refer to a disparity vector derived in inter-view motion prediction. For instance, even though a video coder may code a block with motion prediction (i.e., temporal motion prediction), the video coder does not discard the derived disparity vector. Rather, the video coder may use the disparity vector for the purpose of coding a following block. Specifically, the video coder may treat the disparity vector as an implicit disparity vector and may use the implicit disparity vector in an NBDV derivation process to determine a disparity vector for one or more other blocks.

Typically, when a video coder performs the NBDV derivation process, the video coder checks disparity motion vectors in the temporal neighboring blocks, disparity motion vectors in the spatial neighboring blocks, and then the implicit disparity vector in order. Once the video coder finds the disparity vector, the video coder may terminate the NBDV derivation process.

Backward VSP may be enabled in 3D-HEVC. In 3D-HEVC, when a video coder applies a texture-first coding order, the video coder may derive, for each PU, a disparity vector from the NBDV derivation process with or without consideration of the depth values in a reference depth view. After the video coder obtains a disparity vector, the video coder may further refine the disparity vector for each 4×4 sub-region of one PU if the 4×4 sub-region of the PU is coded with BVSP mode.

The refinement process may include two steps. In the first step, the video coder may select one maximum depth value from a 4×4 depth block in the reference depth view. The video coder may use the derived disparity vector to locate the 4×4 depth block. In the second step, the video coder may convert the depth value to a horizontal component of the refined disparity vector while keeping the vertical component of the refined disparity vector to be 0. After the disparity vector is refined for one 4×4 sub-region of one PU, the video coder may use the refined disparity vector to locate one block in the reference texture view for motion compensation.

Figure 6:
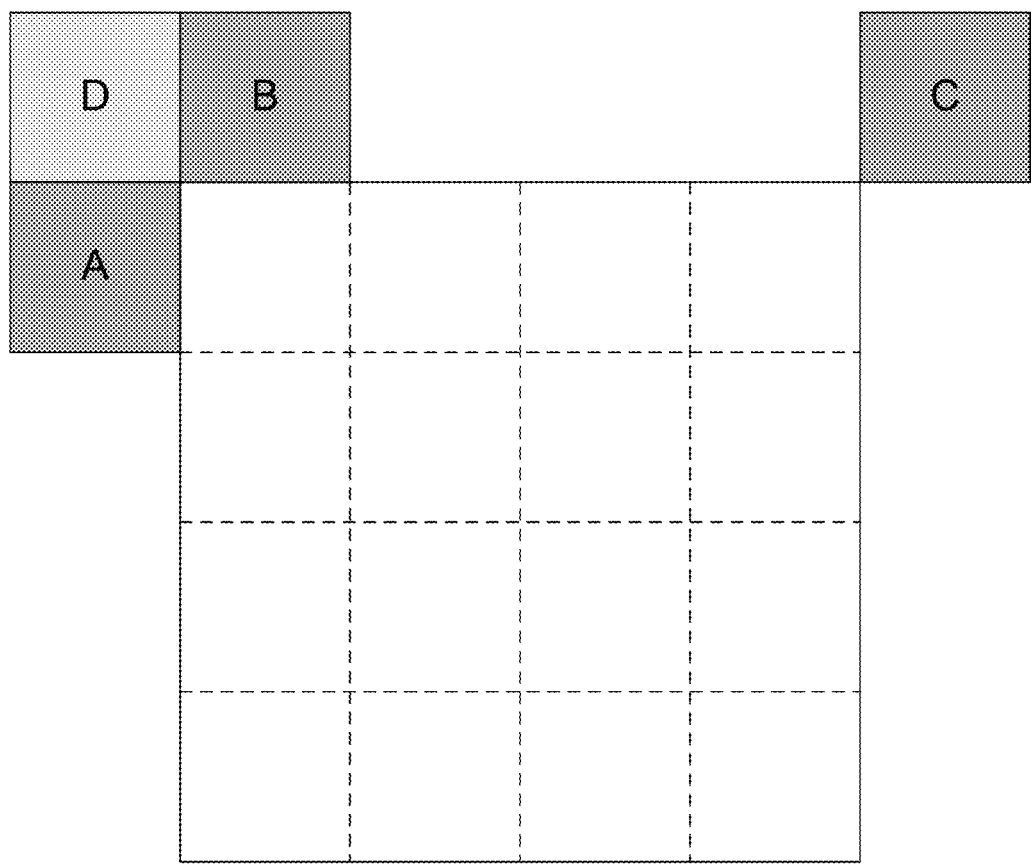
FIG. 6 is a conceptual diagram illustrating spatial neighboring blocks for neighbor-based disparity vector derivation (NBDV).

As described in U.S. Provisional Patent Application No. 61/815,656, filed Apr. 24, 2013, MB-level NBDV may be used to derive a disparity vector for the current MB and further used for motion vector prediction. Once a disparity motion vector is identified, i.e., one of the temporal or spatial neighboring block uses the inter-view reference picture, it is returned as the disparity vector for the current MB. One example implementation of U.S. Provisional Patent Application No. 61/815,656 is described below. In this example implementation, the spatial neighboring blocks that are checked in the AVC motion prediction process are checked in the order of A (left), B (above), C (above-right) and D (above-left) in the proposed NBDV process, as shown in FIG. 6. FIG. 6 is a conceptual diagram illustrating spatial neighboring blocks for NBDV.

Figure 7:
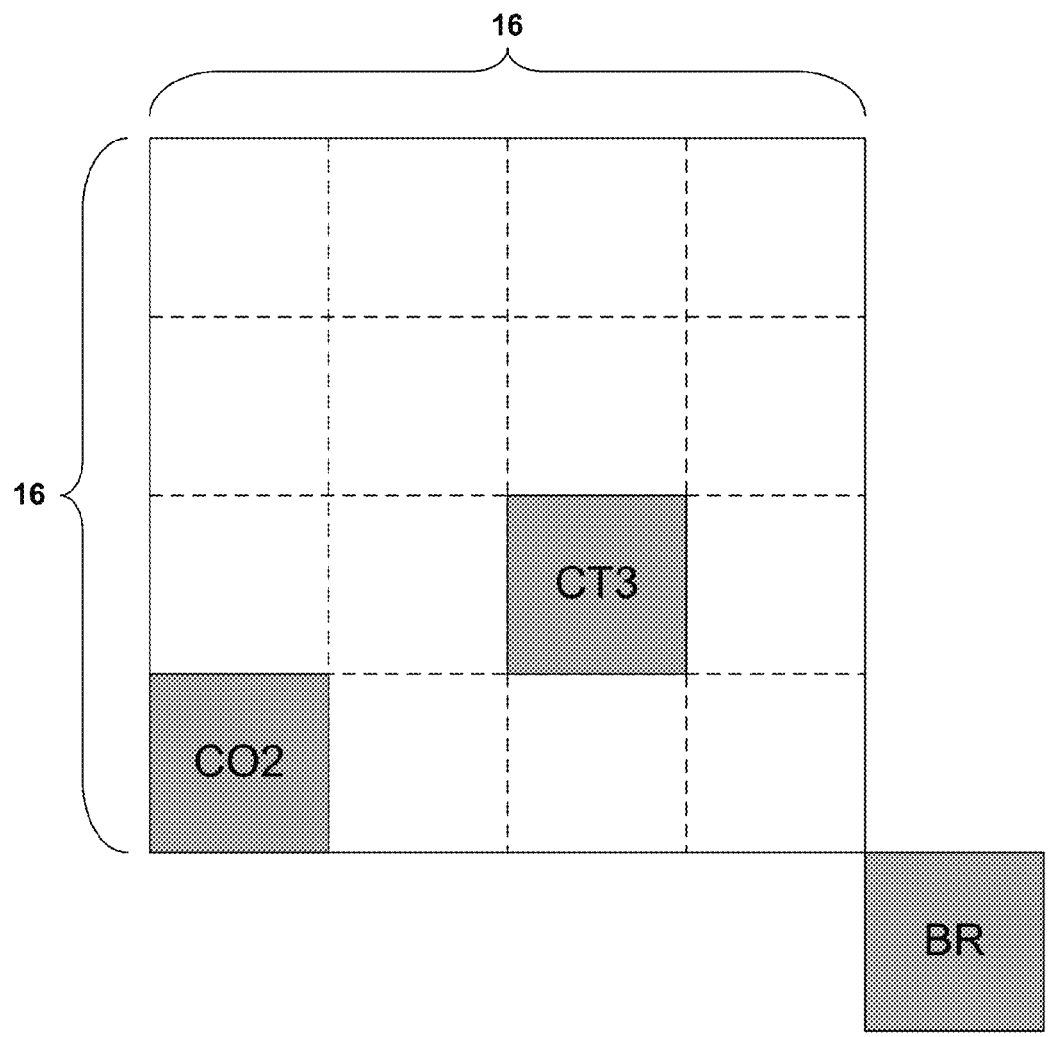
FIG. 7 is a conceptual diagram illustrating example temporal neighboring blocks for NBDV.

Blocks from up to two reference pictures in the same view as the current picture are checked: (RefPicList1[0] and RefPicList0[0] for B slices and RefPicList0[0] for P slices). In some examples, three temporal blocks are checked picture by picture and for each picture, the co-located blocks relative to the co-located MB are checked as indicated below in order of BR (bottom-right), CT3 (center 3) and CO2 (corner 2), as shown in FIG. 7. FIG. 7 is a conceptual diagram illustrating example temporal neighboring blocks for NBDV.

The above-mentioned neighboring blocks are checked in order. Similar to 3D-HEVC, temporal neighboring blocks are checked first and the spatial neighboring blocks are checked afterwards. Once a block containing an available disparity motion vector is identified, the derivation process terminates. The coding gain of the proposed method of U.S. Provisional Patent Application No. 61/815,656, when compared with multi-view coding plus depth (MVC+D) is shown in the following table (TABLE 1). Vetro et al., "Joint Draft 8.0 on Multiview Video Coding," Joint Video Team (JVT) of ISO/IEC MPEG & ITU-T VCEG (ISO/IEC JTC1/SC29/WG11 and ITU-T SG16 Q.6), 28$^{th}$ Meeting, Hannover, D E, 20-25 Jul. 2008, document no. JVT-AB204, is one draft of MVC+D.

TABLE 1

| | Texture Coding | | Depth Coding | | Total (Coded PSNR) | | Total (Synthesed PSNR) | |
|---|---|---|---|---|---|---|---|---|
| | dBR, % | dPSNR, dB | dBR, % | dPSNR, dB | dBR, % | dPSNR, dB | dBR, % | dPSNR, dB |
| S01 | 27.67 | −0.83 | −3.83 | 0.20 | 33.18 | −0.98 | 32.82 | −0.99 |
| S02 | 7.95 | −0.23 | −15.22 | 0.68 | 12.20 | −0.35 | 11.49 | −0.34 |
| S03 | 16.99 | −0.55 | −20.91 | 1.85 | 15.99 | −0.53 | 20.24 | −0.60 |
| S04 | 19.99 | −0.67 | −21.22 | 1.43 | 25.03 | −0.83 | 20.34 | −0.64 |
| S05 | 22.77 | −1.03 | −22.40 | 1.30 | 44.49 | −1.78 | 39.03 | −1.45 |
| S06 | 29.93 | −1.36 | −15.42 | 0.75 | 43.01 | −1.80 | 36.11 | −1.44 |
| S08 | 13.15 | −0.54 | −11.16 | 0.49 | 19.79 | −0.77 | 18.82 | −0.63 |
| Average | 19.78 | −0.74 | −15.74 | 0.96 | 27.67 | −1.01 | 25.55 | −0.87 |

The proposed method of U.S. Provisional Patent Application No. 61/815,656 enables texture-only coding, which is not efficiently supported in 3D-AVC. When enabling the same texture-only configuration, the coding gain from the current 3D-AVC is only 1%.

In some examples, an NBDV derivation process that accesses a depth view component of a reference view is used in 3D-AVC. As described in U.S. Provisional Patent Application 61/770,268 (the '268 application), filed Feb. 27, 2013, the entire content of which is incorporated herein by reference, the NBDV derivation process can be further improved by accessing the depth view component of a base/reference view. As described in the '268 application, a video coder may use the disparity vector derived from the neighboring blocks to locate depth pixels in the depth view component, such that the video coder can further refine the disparity vector. The following table (TABLE 2) shows a coding gain of the proposed method of the '268 application when compared with MVC+D.

TABLE 2

| | Texture Coding | | Depth Coding | | Total (Coded PSNR) | | Total (Synthesed PSNR) | |
|---|---|---|---|---|---|---|---|---|
| | dBR, % | dPSNR, dB | dBR, % | dPSNR, dB | dBR, % | dPSNR, dB | dBR, % | dPSNR, dB |
| S01 | 40.61 | −1.09 | −4.43 | 0.23 | 45.32 | −1.22 | 43.63 | −1.20 |
| S02 | 12.89 | −0.36 | −18.08 | 0.83 | 16.61 | −0.46 | 14.90 | −0.43 |
| S03 | 22.07 | −0.69 | −25.71 | 2.40 | 20.22 | −0.65 | 23.97 | −0.69 |
| S04 | 28.87 | −0.93 | −27.45 | 1.90 | 33.30 | −1.06 | 26.72 | −0.81 |
| S05 | 28.47 | −1.22 | −22.69 | 1.33 | 49.34 | −1.89 | 44.42 | −1.58 |
| S06 | 35.69 | −1.56 | −16.56 | 0.81 | 48.32 | −1.97 | 40.81 | −1.58 |

TABLE 2-continued

| | Texture Coding | | Depth Coding | | Total (Coded PSNR) | | Total (Synthesed PSNR) | |
|---|---|---|---|---|---|---|---|---|
| | dBR, % | dPSNR, dB | dBR, % | dPSNR, dB | dBR, % | dPSNR, dB | dBR, % | dPSNR, dB |
| S08 | 16.48 | −0.66 | −11.57 | 0.51 | 22.51 | −0.85 | 21.52 | −0.70 |
| Average | 26.44 | −0.93 | −18.07 | 1.14 | 33.66 | −1.16 | 30.85 | −1.00 |

As shown above, the proposed method of the '268 application provides 5% more coding gain, although accessing the depth view component is still required.

In 3D-AVC, a derived disparity vector (DDV) has been proposed in U.S. Provisional Patent Application 61/809,174 (the '174 application), filed Apr. 5, 2013, to be maintained for the whole slice (when inter-view prediction is enabled) and updated by each MB. For simplicity, such a DDV may not be calculated for an intra MB. In 3D-HEVC, a derived disparity vector has been proposed in the '174 application to be maintained for the whole slice (when inter-view prediction is enabled) and updated by each CU (or PU). A DDV is set to be the disparity vector of the current block when NBDV does not find any available disparity motion vector from neighboring blocks.

The DDV of the first slice may be typically set to zero. The DDV may be updated in the decoding order. Therefore, an unfavorable decoding dependency may occur for the following cases. First, if CAVLC entropy coding is used in AVC, certain decoders (e.g., smart decoders) may decode the MB rows in parallel with certain delay. Second, when wavefront parallel processing (WPP) is enabled in HEVC, a current coding unit does not necessarily depend on a CU in a previous CTB row. Third, it is possibly less efficient to use a DDV from a CU that is in a previous row but it is far from the current CU in the horizontal direction. For example, it is possible that the first CU of the current CTB row might have quite different ground truth disparity than that of the last CU of the previous CTB row. In general, a ground truth disparity may be the disparity derived from ground truth depth (i.e., the actual depth of an object depicted by a pixel). The techniques of this disclosure may provide more flexibility for e.g., parallelization of the derived disparity vector as proposed in the '174 application.

In accordance with an example technique of this disclosure, in 3D-HEVC or other video coding standards, during the decoding of a CU, the DDV is set to be zero once the current CU is the first CU of the CTB row and/or the first CU of one slice. Therefore, the value of the DDV is not carried across a CTB row. In some examples, regardless of whether the CU is coded with intra or inter prediction, if the CU is the first CU of the CTB that starts a new CTB row, the video coder updates the DDV by setting the DDV to be zero, before coding of any CU of the first CTB of the current CTB row. After an inter CU is coded in a dependent view, even the inter CU is the first one in the CTB row, the video coder updates the DDV to be equal to the DDV of the CU.

Additionally, in accordance with one or more example techniques of this disclosure related to 3D-HEVC or other video coding standards, the DDV is updated to zero, even when a new tile starts or when a new CTB row of a new tile starts. Therefore, in some examples, the video coder does not carry the value of the DDV across a tile and does not carry the value of the DDV across a CTB row of a tile. Thus, in some such examples, for each respective CU of a slice, a video coder may, in response to determining that the respective CU is the first CU of a tile of a picture, set the DDV to an initial value (e.g., zero).

In at least some examples, a tile is a rectangular region of CTBs (or other types of blocks) within a particular tile column and a particular tile row in a picture. A tile column may be a rectangular region of CTBs (or other types of blocks) having a height equal to the height of the picture and a width specified by syntax elements (e.g., in a PPS). A tile row may be a rectangular region of CTBs (or other types of blocks) having a height specified by syntax elements (e.g., in a PPS) and a width equal to the width of the picture.

In accordance with one or more example techniques of this disclosure related to 3D-HEVC or other video coding standards, when the video coder starts coding each slice or tile, the video coder may reset the DDV to zero. Furthermore, the video coder may code (e.g., encode or decoder) a slice using WPP. In this example, when WPP is enabled and the video coder starts coding of a WPP (a CTB row), the video coder resets the DDV to zero. In general, when a video coder starts coding a CTB row, the DDV may be equal to the DDV of the last block (e.g., CU) of the previous CTB row. Thus, the video coder may not be able to start coding the first block of a CTB row until after the video coder has coded the last block of the previous CTB row. This may be incompatible with WPP, which provides for coding of multiple CTB rows in parallel. In this example, when WPP is enabled, the video coder may maintain a separate DDV for each CTB row. Setting the DDV for a CTB to zero when the video coder starts coding the CTB row, as described in this disclosure, may facilitate WPP because the video coder no longer has to wait for the DDV of the last block of the previous CTB row to be determined prior to starting to code the first block of the CTB row. In this way, the techniques of this disclosure may enable increased parallel processing in the video coder.

Additionally, in accordance with one or more example techniques of this disclosure related to 3D-HEVC or other video coding standards, the video coder does not carry the DDV across CTBs. Thus, before the video coder encodes or decodes the first CU or PU of a CTB, the video coder may always set the DDV to 0 first. Hence, in some examples, for each respective CU of the slice, the video coder may, in response to determining that the respective CU is the first CU of a CTB, set the DDV to an initial value (e.g., zero).

In H.264/AVC and other video coding standards, a video coder may use different entropy codecs in different profiles. For example, a video coder operating in one profile (e.g., a Baseline profile, an Extended profile, etc.) may use CAVLC to code syntax elements representing transform coefficients. In this example, a video coder operating in another profile may use CABAC to entropy code the syntax elements representing transform coefficients. In accordance with one or more example techniques of this disclosure related to 3D-AVC or other video coding standards, a video coder resets the DDV to be zero after the video coder decodes a MB starting a new MB row and/or the first MB of one slice.

In some examples, the video coder only resets a DDV to zero if the entropy codec is CAVLC and the video coder does not reset the DDV to zero if the entropy codec is CABAC. In this example, the entropy codec may be a codec used to entropy encode and entropy decode syntax elements representing transform coefficients for the current block (e.g., the current MB). Accordingly, in some examples, the video coder may reset the DDV to zero if an entropy codec is CAVLC and does not reset the DDV to zero if the entropy coded is CABAC.

In accordance with some or all of the techniques of this disclosure described above, instead of setting DDV to zero for the first CU of a slice, tile, CTB row or CTB, the video coder may set the DDV to be converted by accessing camera parameters (e.g., a global disparity calculated by converting the horizontal displacement of two views). In some examples, a disparity vector may be converted from a depth value of 128. In general, the camera parameters may be parameters that may be used for converting depth information to disparity information. In some examples, camera parameters are signaled in a SPS or VPS. Thus, in some examples, the video coder may determine the value to which the DDV is set based at least in part on one or more camera parameters. In some such examples, the one or more camera parameters include a horizontal displacement of two views.

An example of the proposed method for 3D-HEVC or other video coding standards is described step by step as follows:
1. A DDV is set to zero before decoding one slice or one picture.
2. For each CTB in decoding order (in a view component with inter-view prediction enabled), the following apply:
    a. For each CU in decoding order, the following apply:
        i. If the CU belongs to a CTB that starts a new CTB row, the video coder sets the DDV to zero.
        ii. If the current CU is not intra coded, the video coder invokes an NBDV derivation process;
            1. If the video coder determines that the NBDV is unavailable by checking neighboring blocks, the video coder sets the disparity vector of the current CU to the DDV.
            2. Otherwise, the video coder sets the disparity vector of the current CU to the result of the NBDV derivation process (i.e., the NBDV).
        iii. The video coder decodes the current CU as described in 3D-HEVC;
        iv. If the current CU is not intra coded, the video coder updates the DDV to be equal to the disparity vector of the current CU.

Thus, in accordance with at least one example of this disclosure, for each respective CU of a slice of a picture of the video data, video encoder 20 may, in response to determining that the respective CU is the first CU of a CTB row of the picture or the respective CU is the first CU of the slice, set a DDV to an initial value, such as 0 or another value. Furthermore, in this example, video encoder 20 may perform an NBDV process that attempts to determine a disparity vector for the respective CU. In some examples of this disclosure, performing the NBDV process involves checking temporal and/or spatial neighboring blocks of a current block (e.g., a CU, macroblock, etc.) for disparity motion vectors. In such examples, the NBDV process may successfully determine a disparity vector for the current block if the NBDV process is able to identify a temporal or neighboring block that has a disparity motion vector.

Furthermore, when performing the NBDV process does not identify an available disparity vector for the respective CU (e.g., when none of the neighboring blocks has a disparity motion vector), video encoder 20 may determine that the disparity vector for the respective CU is equal to the DDV. Furthermore, video encoder 20 may generate, based in part on the disparity vector for the respective CU, an encoded representation of a coding block for the respective CU.

In a similar example, for each respective CU of a slice of a picture of the video data, video decoder 30 may, in response to determining that the respective CU is the first CU of a CTB row of the picture or the respective CU is the first CU of the slice, set a DDV to an initial value, such as 0 or another value. Furthermore, in this example, video decoder 30 may perform an NBDV process that attempts to determine a disparity vector for the respective CU. When performing the NBDV process does not identify an available disparity vector for the respective CU (e.g., when none of the neighboring blocks has a disparity motion vector), video decoder 30 may determine that the disparity vector for the respective CU is equal to the DDV. Furthermore, video decoder 30 may reconstruct, based in part on the disparity vector for the respective CU, a coding block for the respective CU.

In some examples, in the context of H.264/AVC and other video coding standards, video encoder 20 may perform the following actions for each respective macroblock of a slice of a picture of video data. For example, in response to determining that the respective macroblock is the first macroblock of a macroblock row of the picture or the respective macroblock is the first macroblock of the slice, video encoder 20 may set a DDV to an initial value (e.g., zero). Additionally, video encoder 20 may perform an NBDV process that attempts to determine a disparity vector for the respective macroblock. When performing the NBDV process does not identify an available disparity vector for the respective macroblock, video encoder 20 may determine that the disparity vector for the respective macroblock is equal to the DDV. Video encoder 20 may generate, based in part on the disparity vector for the respective macroblock, an encoded representation of a sample block (i.e., coding block) for the respective macroblock.

Similarly, in some examples in the context of H.264/AVC and other video coding standards, video decoder 30 may perform the following actions for each respective macroblock of a slice of a picture of video data. Particularly, in response to determining that the respective macroblock is the first macroblock of a macroblock row of the picture or the respective macroblock is the first macroblock of the slice, video decoder 30 may set a DDV to an initial value (e.g., zero). Additionally, video decoder 30 may perform an NBDV process that attempts to determine a disparity vector for the respective macroblock. When performing the NBDV process does not identify an available disparity vector for the respective macroblock, video decoder 30 may determine that the disparity vector for the respective macroblock is equal to the DDV. Video decoder 30 may reconstruct, based in part on the disparity vector for the respective macroblock, a sample block (i.e., coding block) for the respective macroblock.

Figure 8:
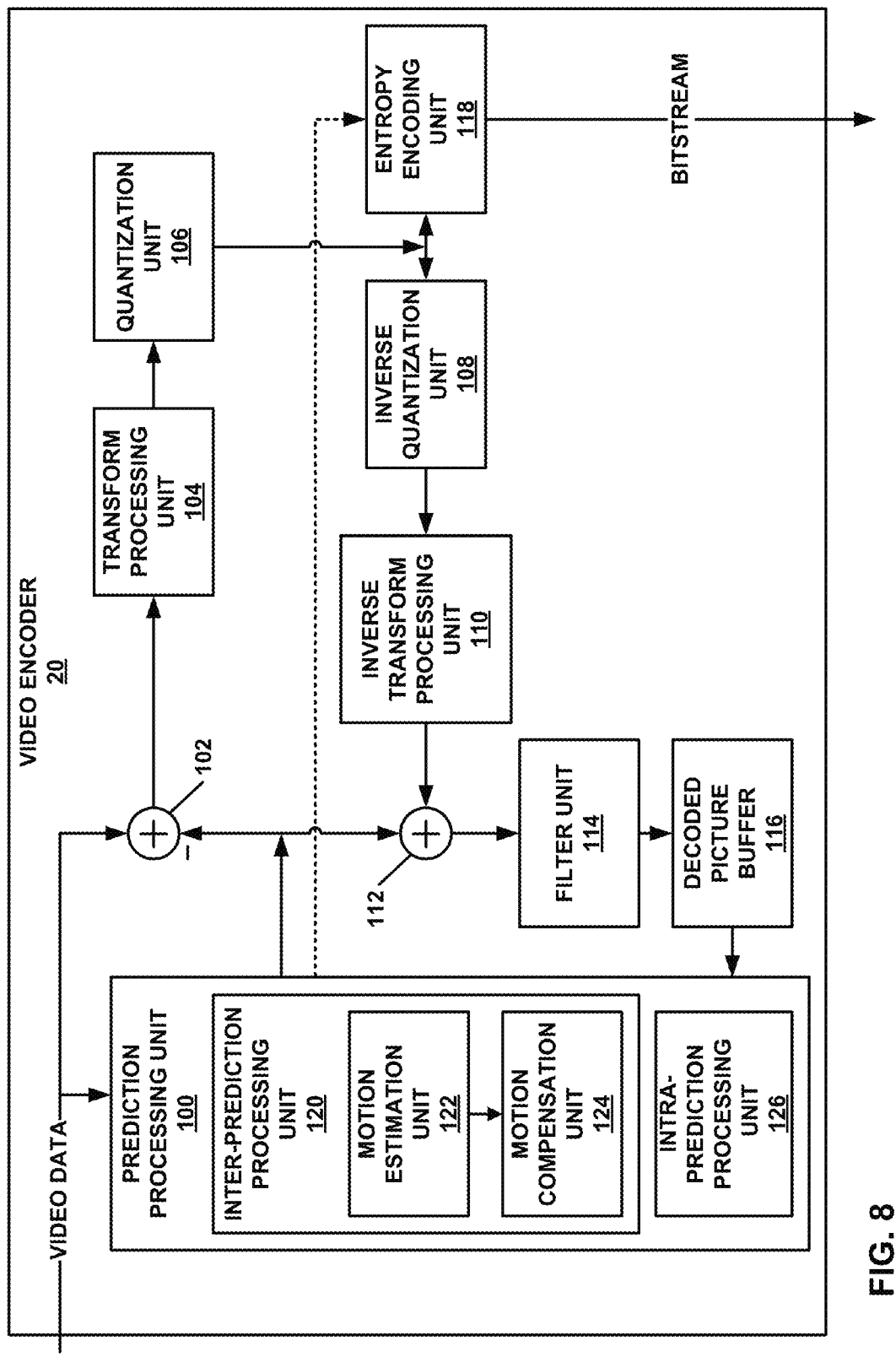
FIG. 8 is a block diagram illustrating an example video encoder that may implement one or more techniques described in this disclosure.

FIG. 8 is a block diagram illustrating an example video encoder 20 that may implement one or more techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may have (i.e., be associated with) equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks of (i.e., associated with) the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for video blocks encoded in I-mode, the predictive block is formed using spatial prediction from previously-encoded neighboring blocks within the same frame.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, the motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block for a PU based on samples of neighboring PUs. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes. In some examples, the number of intra prediction modes may depend on the size of the prediction blocks of the PU.

In some examples, prediction processing unit 100 may implement inter-view motion prediction and/or inter-view residual prediction. To implement inter-view motion prediction and/or inter-view residual prediction, prediction processing unit 100 may perform an NBDV derivation process to determine disparity vectors for blocks (e.g., CUs, PU, etc) of a slice. Prediction processing unit 100 may use the disparity vectors for inter-view motion prediction and/or inter-view residual prediction.

In accordance with one or more techniques of this disclosure, for each respective CU of a slice, prediction processing unit 100 may set, in response to determining that the respective CU is the first CU of a CTB row of the picture or the respective CU is the first CU of the slice, a DDV to an initial value. Furthermore, prediction processing unit 100 may perform an NBDV process that attempts to determine a disparity vector for the respective CU. When performing the NBDV process does not identify an available disparity vector for the respective CU, prediction processing unit 100 may determine that the disparity vector for the respective CU is equal to the DDV. In this way, prediction processing unit 100 may determine disparity vectors for CUs of the slice.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) of a CU and the selected predictive blocks (e.g., luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of (i.e., associated with) a CU into transform blocks of (i.e., associated with) TUs of the CU. Thus, a TU may have (i.e., be associated with) a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate coefficient blocks for each TU of a CU by applying one or more transforms to the transform blocks of the TU. Transform processing unit 104 may apply various transforms to a transform block of (i.e., associated with) a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and one or more inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block of (i.e., associated with) a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks of (i.e., associated with) a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data.

Video encoder 20 may output a bitstream that includes entropy-encoded data generated by entropy encoding unit 118. For instance, the bitstream may include data that represent a RQT for a CU. The bitstream may also include syntax elements that are not entropy encoded.

Figure 9:
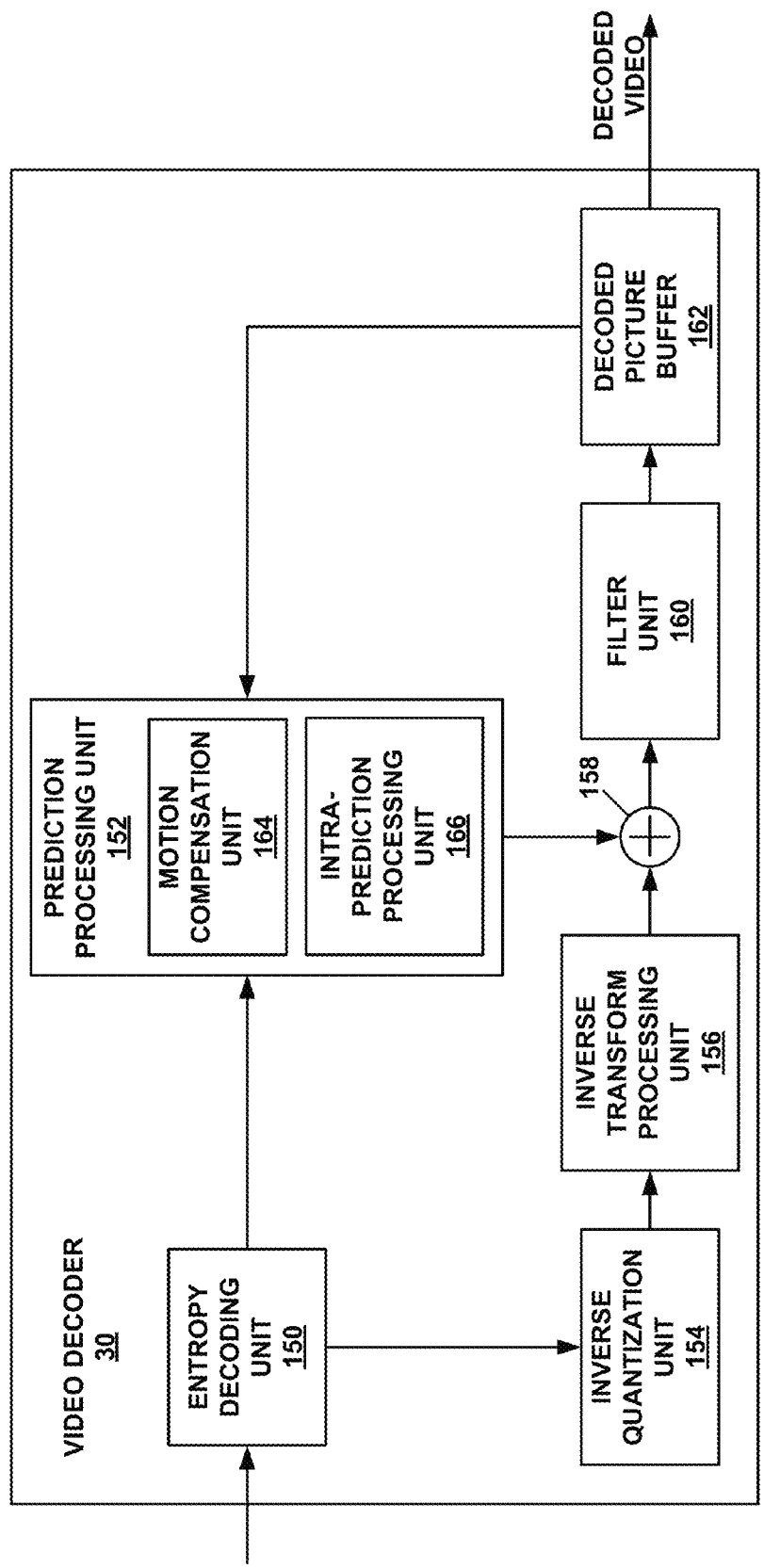
FIG. 9 is a block diagram illustrating an example video decoder that may implement one or more techniques described in this disclosure.

FIG. 9 is a block diagram illustrating an example video decoder 30 that may implement one or more techniques described in this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform reconstruction operations on CUs. To perform a reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., luma, Cb and Cr predictive blocks) for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., luma, Cb and Cr predictive blocks) for the PU.

In some examples, prediction processing unit 152 may implement inter-view motion prediction and/or inter-view residual prediction. To implement inter-view motion prediction and/or inter-view residual prediction, prediction processing unit 152 may perform an NBDV derivation process to determine disparity vectors for blocks (e.g., CUs, PU, etc) of a slice. Prediction processing unit 152 may use the disparity vectors for inter-view motion prediction and/or inter-view residual prediction.

In accordance with one or more techniques of this disclosure, for each respective CU of a slice, prediction processing unit 152 may set, in response to determining that the respective CU is the first CU of a CTB row of the picture or the respective CU is the first CU of the slice, a DDV to an initial value. Furthermore, prediction processing unit 152 may perform an NBDV process that attempts to determine a disparity vector for the respective CU. When performing the NBDV process does not identify an available disparity vector for the respective CU, prediction processing unit 152 may determine that the disparity vector for the respective CU is equal to the DDV. In this way, prediction processing unit 152 may determine disparity vectors for CUs of the slice.

Reconstruction unit 158 may use transform blocks (e.g., luma, Cb and Cr transform blocks) associated with TUs of a CU and the predictive blocks (e.g., luma, Cb and Cr blocks) of the PUs of the CU, i.e., either intra-prediction data or inter-prediction data, as applicable, to reconstruct coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., the luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may obtain, from the bitstream, transform coefficient levels of a coefficient block, inverse quantize the transform coefficient levels, and apply a transform to the transform coefficient levels to generate a transform block. Furthermore, video decoder 30 may generate, based at least in part on the transform block, a coding block. Video decoder 30 may output the coding block for display.

Figure 10:
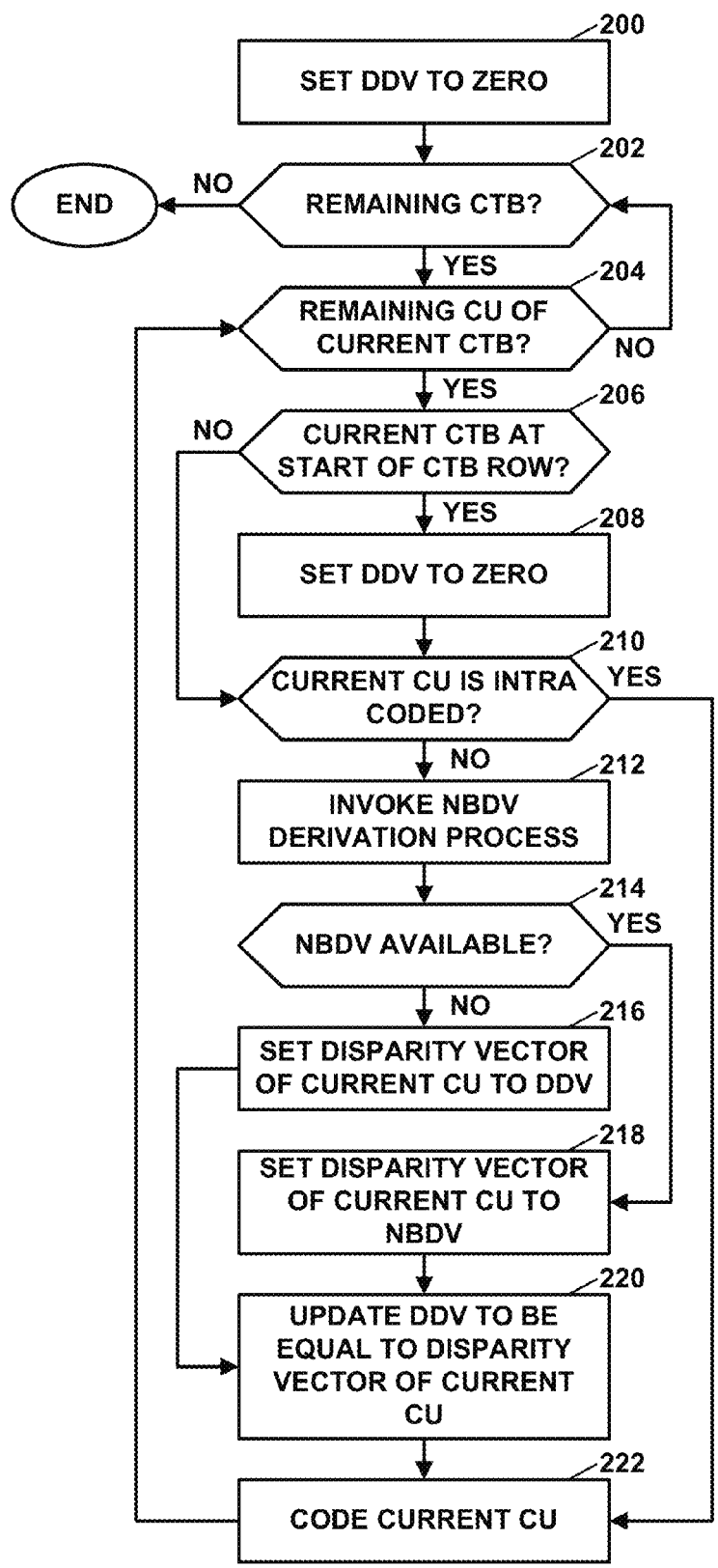
FIG. 10 is a flowchart illustrating an example operation of a video coder, in accordance with one or more techniques of this disclosure.

FIG. 10 is a flowchart illustrating an example operation of a video coder, in accordance with one or more techniques of this disclosure. FIG. 10 is provided as an example. Other example operations of video coders in accordance with the techniques of this disclosure may include more, fewer, or different actions. Although the example of FIG. 10 is described with reference to CUs and CTUs, similar examples are contemplated in this disclosure for other types of blocks, such as macroblocks, macroblock partitions, and so on.

In the example of FIG. 10, the video coder (e.g., video encoder 20 or video decoder 30) may set a DDV to zero (200). For instance, the video coder may set both the horizontal component and the vertical component of the DDV to zero. The video coder may set the DDV to zero before coding (e.g., encoding or decoding) a slice or picture.

Furthermore, in the example of FIG. 10, the video coder may perform actions (202) through (222) with respect to each CTB of the current slice. In this way, the video coder may code each of the CTBs of the current slice. Accordingly, in the example of FIG. 10, the video coder may determine whether there are any CTBs in a current slice remaining to be coded (i.e., remaining CTBs) (202). If there are one or more remaining CTBs in the current slice ("YES" of 202), the video coder may code each CU of a current CTU. Accordingly, if there are one or more CUs of the current CTU remaining to be coded ("YES" of 202), the video coder may determine whether there are any CUs of the current CTU remaining to be coded (i.e., remaining CUs) (204).

If there are one or more remaining CUs of the current CTU ("YES" of 204), the video coder may determine whether the current CTU is at the start of a new CTB row (206). Responsive to determining that the current CTU is at the start of a new CTB row ("YES" of 206), the video coder may set the DDV to zero (208). After setting the DDV to zero or determining that the current CTU is not at the start of a new CTB row ("NO" of 206), the video coder may determine whether the current CU of the current CTU is intra coded (210).

Responsive to determining that the current CU is not intra coded ("NO" of 210), the video coder may invoke an NBDV derivation process (212). Thus, in the example of FIG. 10 and potentially other examples of this disclosure, the video coder may perform the NBDV process only if the current CU is not intra coded.

The NBDV derivation process may attempt to determine a disparity vector for the current CU based on a disparity motion vector of a neighboring block. For example, when the video coder performs the NBDV derivation process, the video coder may determine a temporal neighboring block. If the temporal neighboring block has a disparity motion vector, the video coder may set the disparity vector of the current block (e.g., CU, macroblock, etc.) based on the disparity motion vector of the temporal neighboring block. For instance, the video coder may set the disparity vector of the current block equal to the disparity motion vector of the temporal neighboring block.

Furthermore, in this example, if the temporal neighboring block does not have a disparity motion vector, the video coder may check spatial neighboring blocks for a spatial neighboring block that has a disparity motion vector. In this example, if one of the spatial neighboring blocks has a disparity motion vector, the video coder may set the disparity vector of the current block based on (e.g., equal to) the disparity motion vector of the spatial neighboring block. In this example, the NBDV derivation process may be unsuccessful in determining a disparity vector for the current block if none of the temporal or spatial neighboring blocks checked has a disparity motion vector. In other words, in this and other examples, the NBDV derivation process does not identify an available disparity vector for the current block if none of the temporal or spatial neighboring blocks checked has a disparity motion vector.

In the example of FIG. 10, the video coder may determine whether the NBDV derivation process identifies a disparity vector for the current CU (i.e., determines an NBDV is available) (214). If the NBDV is not available ("NO" of 214), the video coder may set the disparity vector of the current CU to the DDV (216). Otherwise, if the NBDV is available ("YES" of 214), the video coder may set the disparity vector of the current CU to the NBDV (218). Thus, in the example of FIG. 10 and potentially other examples of this disclosure, when performing the NBDV process does determine an available disparity vector for the respective CU, the video coder may set the disparity vector for the respective CU equal to the available disparity vector identified by the NBDV process (i.e., the NBDV).

Furthermore, after setting the disparity vector of the current CU, the video coder may update the DDV to be equal to the disparity vector of the current CU (220). Thus, in the example of FIG. 10 and potentially other examples of this disclosure, in response to determining that the respective CU is not intra coded, the video coder may update the DDV to be equal to the disparity vector of the respective CU.

After updating the DDV, or after determining that the current CU is intra coded ("YES" of 210), the video coder may code (e.g., encode or decode) the current CU (222). For example, the video coder may reconstruct, based in part on the disparity vector for the respective CU, a coding block for the respective CU. In some examples, the video coder may generate, based in part on the disparity vector for the respective CU, an encoded representation of a coding block for the respective CU.

Figure 11A:
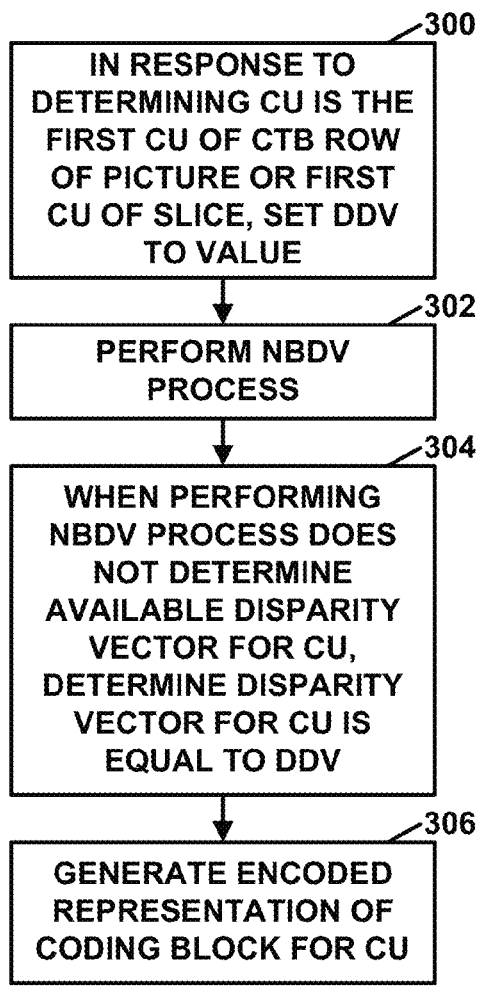
FIG. 11A is a flowchart illustrating an example operation of a video encoder, in accordance with one or more techniques of this disclosure.

FIG. 11A is a flowchart illustrating an example operation of video encoder 20, in accordance with one or more techniques of this disclosure. FIG. 11A is provided as an example. Other example operations of video encoders in accordance with the techniques of this disclosure may include more, fewer, or different actions.

In the example of FIG. 11A, video encoder 20 may perform actions (300) through (306) for each respective CU of a slice of a picture of video data. Particularly, in response to determining that the respective CU is the first CU of a CTB row of the picture or the respective CU is the first CU of the slice, video encoder 20 may set a DDV to an initial value (e.g., zero) (300). Additionally, video encoder 20 may perform an NBDV process that attempts to determine an available disparity vector for the respective CU (302). When performing the NBDV process does not determine an available disparity vector for the respective CU, video encoder 20 may determine that the disparity vector for the respective CU is equal to the DDV (304).

Video encoder 20 may generate, based in part on the disparity vector for the respective CU, an encoded representation of a coding block for the respective CU (306). For example, as part of generating the encoded representation of the coding block for the respective CU based in part on the disparity vector for the respective CU, video encoder 20 may use the disparity vector for the respective CU to perform inter-view motion prediction and/or inter-view residual prediction for the respective CU, as described elsewhere in this disclosure.

Figure 11B:
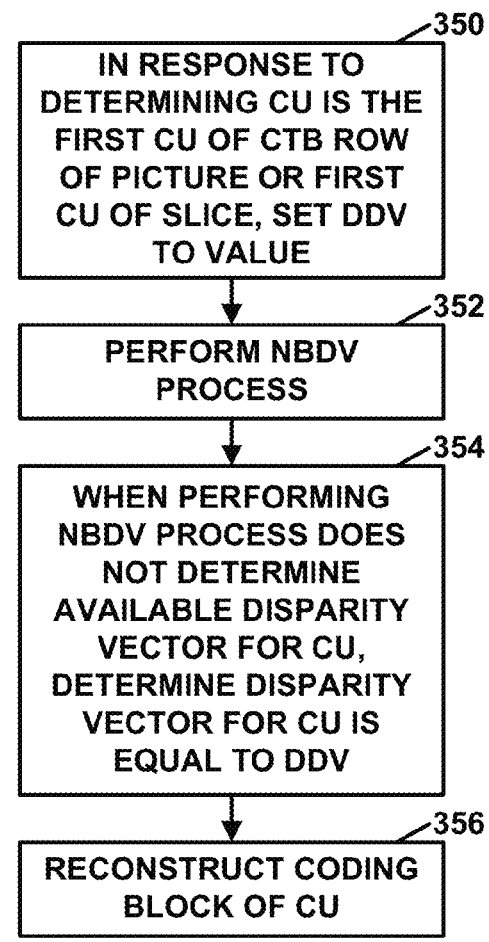
FIG. 11B is a flowchart illustrating an example operation of a video decoder, in accordance with one or more techniques of this disclosure.

FIG. 11B is a flowchart illustrating an example operation of video decoder 30, in accordance with one or more techniques of this disclosure. FIG. 11B is provided as an example. Other example operations of video decoders in accordance with the techniques of this disclosure may include more, fewer, or different actions.

In the example of FIG. 11B, video decoder 30 may perform actions (350) through (356) for each respective CU of a slice of a picture of video data. Particularly, in response to determining that the respective CU is the first CU of a CTB row of the picture or the respective CU is the first CU of the slice, video decoder 30 may set a DDV to an initial value (e.g., zero) (350). Additionally, video decoder 30 may perform an NBDV process that attempts to determine an available disparity vector for the respective CU (352). When performing the NBDV process does not determine an available disparity vector for the respective CU, video decoder 30 may determine that the disparity vector for the respective CU is equal to the DDV (354).

Video decoder 30 may reconstruct, based in part on the disparity vector for the respective CU, a coding block for the respective CU (356). For example, as part of reconstructing the coding block for the respective CU based in part on the disparity vector for the respective CU, the video coder may use the disparity vector for the respective CU to perform inter-view motion prediction and/or inter-view residual prediction for the respective CU, as described elsewhere in this disclosure.

Figure 12A:
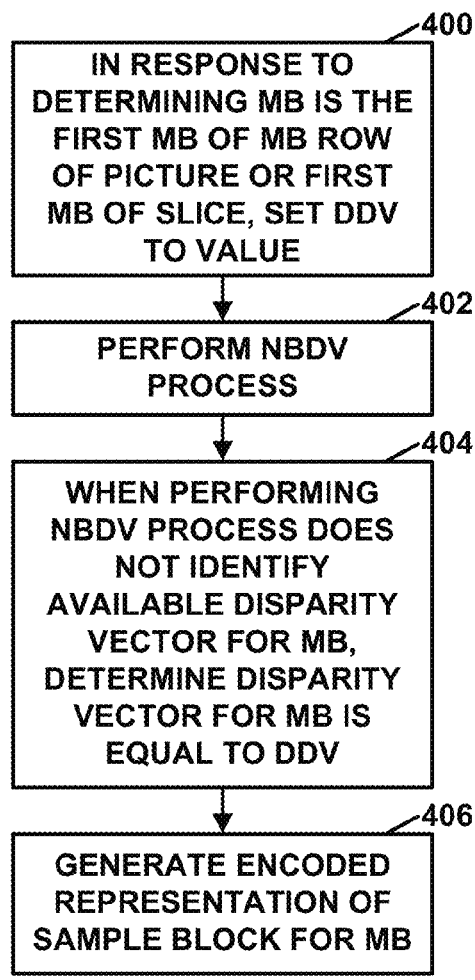
FIG. 12A is a flowchart illustrating an example operation of a video encoder, in accordance with one or more techniques of this disclosure.

FIG. 12A is a flowchart illustrating an example operation of video encoder 20, in accordance with one or more techniques of this disclosure. FIG. 12A is provided as an example. Other example operations of video encoders in accordance with the techniques of this disclosure may include more, fewer, or different actions.

In the example of FIG. 12A, video encoder 20 may perform actions (400) through (406) for each respective macroblock of a slice of a picture of video data. Particularly, in response to determining that the respective macroblock is the first macroblock of a macroblock row of the picture or the respective macroblock is the first macroblock of the slice, video encoder 20 may set a DDV to an initial value (e.g., zero) (400). Additionally, video encoder 20 may perform an NBDV process that attempts to determine a disparity vector for the respective macroblock (402). When performing the NBDV process does not identify an available disparity vector for the respective macroblock, video encoder 20 may determine that the disparity vector for the respective macroblock is equal to the DDV (404).

Video encoder 20 may generate, based in part on the disparity vector for the respective macroblock, an encoded representation of a sample block (i.e., a coding block) for the respective macroblock (406). For example, as part of generating the encoded representation of the sample block for the respective macroblock based in part on the disparity vector for the respective macroblock, video encoder 20 may use the disparity vector for the respective macroblock to perform inter-view motion prediction and/or inter-view residual prediction for the respective macroblock, as described elsewhere in this disclosure.

Figure 12B:
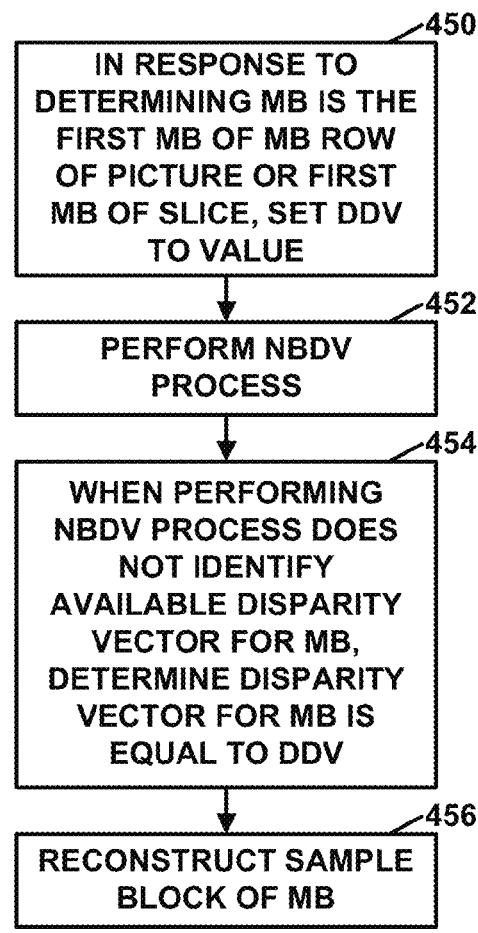
FIG. 12B is a flowchart illustrating an example operation of a video decoder, in accordance with one or more techniques of this disclosure.

FIG. 12B is a flowchart illustrating an example operation of video decoder 30, in accordance with one or more techniques of this disclosure. FIG. 12B is provided as an example. Other example operations of video decoders in accordance with the techniques of this disclosure may include more, fewer, or different actions.

In the example of FIG. 12B, video decoder 30 may perform actions (450) through (456) for each respective macroblock of a slice of a picture of video data. Particularly, in response to determining that the respective macroblock is the first macroblock of a macroblock row of the picture or the respective macroblock is the first macroblock of the slice, video decoder 30 may set a DDV to an initial value (e.g., zero) (450). Additionally, video decoder 30 may perform an NBDV process that attempts to determine a disparity vector for the respective macroblock (452). When performing the NBDV process does not identify an available disparity vector for the respective macroblock, video decoder 30 may determine that the disparity vector for the respective macroblock is equal to the DDV (454).

Video decoder 30 may reconstruct, based in part on the disparity vector for the respective macroblock, a sample block for the respective macroblock (456). For example, as part of reconstructing the sample block for the respective macroblock based in part on the disparity vector for the respective macroblock, the video coder may use the disparity vector for the respective macroblock to perform inter-view motion prediction and/or inter-view residual prediction for the respective macroblock, as described elsewhere in this disclosure In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
for each respective coding unit (CU) of a slice of a picture of the video data:
determining whether the respective CU occurs first among CUs in a row of coding tree blocks (CTBs) in the slice;
in response to determining that the respective CU occurs first among CUs in the row of CTBs, setting a derived disparity vector (DDV) to an initial value;
performing a neighbor-based disparity vector derivation (NBDV) process that attempts to determine an available disparity vector for the respective CU;
setting the disparity vector for the respective CU, wherein in response to the NBDV process not determining an available disparity vector for the respective CU, the disparity vector for the respective CU is set equal to the DDV, or in response to the NBDV process determining an available disparity vector for the respective CU, the disparity vector for the respective CU is set equal to the available disparity vector determined by the NBDV process;
reconstructing, based in part on the disparity vector for the respective CU, a coding block for the respective CU;
determining whether the respective CU is intra coded; and
after setting the disparity vector for the respective CU and in response to determining that the respective CU is not intra coded, updating the DDV to be equal to the disparity vector of the respective CU.

2. The method of claim 1, further comprising, for each respective CU of the slice:
in response to determining that the respective CU is the first CU of a tile of the picture, setting the DDV to the initial value.

3. The method of claim 1, wherein the slice is decoded using wavefront parallel processing (WPP).

4. The method of claim 1, further comprising, for each respective CU of the slice:
in response to determining that the respective CU is the first CU of a CTB, setting the DDV to the initial value.

5. The method of claim 1, wherein the initial value is zero.

6. The method of claim 1, further comprising determining the initial value based at least in part on one or more camera parameters, wherein the one or more camera parameters include a horizontal displacement of two views.

7. The method of claim 1, further comprising performing the NBDV process only if the current CU is not intra coded.

8. A method of encoding video data, the method comprising:
for each respective coding unit (CU) of a slice of a picture of the video data:
determining whether the respective CU occurs first among CUs in a row of coding tree blocks (CTBs) in the slice;
in response to determining that the respective CU occurs first among CUs in the row of CTBs, setting a derived disparity vector (DDV) to an initial value;
performing a neighbor-based disparity vector derivation (NBDV) process that attempts to determine an available disparity vector for the respective CU;
setting the disparity vector for the respective CU, wherein in response to the NBDV process not determining an available disparity vector for the respective CU, the disparity vector for the respective CU is set equal to the DDV, or in response to the NBDV process determining an available disparity vector for the respective CU, the disparity vector for the respective CU is set equal to the available disparity vector determined by the NBDV process;
generating, based in part on the disparity vector for the respective CU, an encoded representation of a coding block for the respective CU;
determining whether the respective CU is intra coded; and
after setting the disparity vector for the respective CU and in response to determining that the respective CU is not intra coded, updating the DDV to be equal to the disparity vector of the respective CU.

9. The method of claim 8, further comprising, for each respective CU of the slice:
in response to determining that the respective CU is the first CU of a tile of the picture, setting the DDV to the initial value.

10. The method of claim 8, wherein the slice is encoded using wavefront parallel processing (WPP).

11. The method of claim 8, further comprising, for each respective CU of the slice:
in response to determining that the respective CU is the first CU of a CTB, setting the DDV to the initial value.

12. The method of claim 8, wherein the initial value is zero.

13. The method of claim 8, further comprising determining the initial value based at least in part on one or more camera parameters, wherein the one or more camera parameters include a horizontal displacement of two views.

14. The method of claim 8, further comprising: performing the NBDV process only if the current CU is not intra coded.

15. A device for coding video data, the device comprising:
a buffer storing decoded pictures of the video data; and
one or more processors configured such that, for each respective coding unit (CU) of a slice of a picture of the video data, the one or more processors:
determine whether the respective CU occurs first among CUs in a row of coding tree blocks (CTBs) in the slice;
in response to determining that the respective CU occurs first among CUs in the row of CTBs, set a derived disparity vector (DDV) to an initial value;
perform a neighbor-based disparity vector derivation (NBDV) process that attempts to determine an available disparity vector for the respective CU;
set the disparity vector for the respective CU, wherein in response to the NBDV process not determining an available disparity vector for the respective CU, the disparity vector for the respective CU is set equal to the DDV, or in response to the NBDV process determining an available disparity vector for the respective CU, the disparity vector for the respective CU is set equal to the available disparity vector determined by the NBDV process;

determine whether the respective CU is intra coded; and after setting the disparity vector for the respective CU and in response to determining that the respective CU is not intra coded, update the DDV to be equal to the disparity vector of the respective CU.

16. The device of claim 15, wherein the one or more processors are configured such that, for each respective CU of the slice, the one or more processors:

in response to determining that the respective CU is the first CU of a tile of the picture, set the DDV to the initial value.

17. The device of claim 15, wherein the slice is coded using wavefront parallel processing (WPP).

18. The device of claim 15, wherein the one or more processors are configured such that, for each respective CU of the slice, the one or more processors:

in response to determining that the respective CU is the first CU of a CTB, set the DDV to the initial value.

19. The device of claim 15, wherein the initial value is zero.

20. The device of claim 15, wherein the one or more processors are configured to determine the initial value based at least in part on one or more camera parameters, wherein the one or more camera parameters include a horizontal displacement of two views.

21. The device of claim 15, wherein the one or more processors are configured to perform the NBDV process only if the current CU is not intra coded.

22. The device of claim 15, wherein the one or more processors are configured to reconstruct, based in part on the disparity vector for the respective CU, a coding block for the respective CU.

23. The device of claim 15, wherein the one or more processors are configured to generate, based in part on the disparity vector for the respective CU, an encoded representation of a coding block for the respective CU.

* * * * *